US011507365B2

(12) United States Patent
Itatsu

(10) Patent No.: US 11,507,365 B2
(45) Date of Patent: Nov. 22, 2022

(54) ON-BOARD UPDATE DEVICE, UPDATE PROCESSING PROGRAM, PROGRAM UPDATE METHOD, AND ON-BOARD UPDATE SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Taro Itatsu, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 91 days.

(21) Appl. No.: 17/279,796

(22) PCT Filed: Oct. 15, 2019

(86) PCT No.: PCT/JP2019/040360
§ 371 (c)(1),
(2) Date: Mar. 25, 2021

(87) PCT Pub. No.: WO2020/080321
PCT Pub. Date: Apr. 23, 2020

(65) Prior Publication Data
US 2021/0397433 A1 Dec. 23, 2021

(30) Foreign Application Priority Data
Oct. 15, 2018 (JP) .............................. JP2018-194530

(51) Int. Cl.
*G06F 8/65* (2018.01)
*B60R 16/023* (2006.01)
*H04L 67/12* (2022.01)

(52) U.S. Cl.
CPC .............. *G06F 8/65* (2013.01); *B60R 16/023* (2013.01); *H04L 67/12* (2013.01)

(58) Field of Classification Search
USPC ....................................................... 717/172
See application file for complete search history.

(56) References Cited

U.S. PATENT DOCUMENTS 10,437,680 B2   10/2019  Kito et al.
2014/0006555 A1* 1/2014  Shields .................. H04L 67/34
                                                 709/217

(Continued)

FOREIGN PATENT DOCUMENTS

CA         2968093 A1 *  2/2018  ............. G06F 21/44

OTHER PUBLICATIONS

International Search Report, Application No. PCT/JP2019/040360, dated Dec. 17, 2019. ISA/Japan Patent Office.

*Primary Examiner* — Qing Chen
*Assistant Examiner* — Clint Thatcher
(74) *Attorney, Agent, or Firm* — Honigman LLP

(57) ABSTRACT

An on-board update device that acquires an update program transmitted from an external server located outside a vehicle, and performs processing to update a program for an on-board ECU provided in the vehicle, the on-board update device including a control unit that controls transmission of the update program to the on-board ECU, wherein, when the transmission is to be resumed after an interruption of the transmission, if identification information of the on-board ECU is different from the identification information before the interruption of the transmission, the control unit deter- (Continued)

mines that the on-board ECU has been replaced during the interruption of the transmission, and performs predetermined processing.

10 Claims, 10 Drawing Sheets

(56) References Cited

U.S. PATENT DOCUMENTS

| | | | |
|---|---|---|---|
| 2014/0282470 A1* | 9/2014 | Buga | G06F 8/65 |
| | | | 717/170 |
| 2016/0170775 A1* | 6/2016 | Rockwell | G06F 13/4282 |
| | | | 713/100 |
| 2017/0242688 A1* | 8/2017 | Yu | G06F 8/658 |
| 2019/0210545 A1* | 7/2019 | Sangameswaran | B60R 16/033 |
| 2019/0265966 A1 | 8/2019 | Shimomura | |
| 2020/0225930 A1 | 7/2020 | Teraoka et al. | |

* cited by examiner

FIG. 3

Vehicle configuration information master table

| ECU-ID | A | B | Software part number | Current version | Old version | C | Operating region |
|---|---|---|---|---|---|---|---|
| 001 | SN-ABC-0120 | AAAA | swaaa | 3.51 | 3.44 | 1 | D |
| 002 | SN-XCC-9999 | BBBB | swbbb | 4.2d | 4.2c | 2 | E |
| 003 | ..... | ..... | | | | | |
| 004 | ..... | ..... | | | | | |

| Mac address | IP address | F | G |
|---|---|---|---|
| f2-23-xx-15-fc-xx | 192.168.10.5 | 2018/3/20/18:15 | H |
| ab-xx-55-23-ac-xx | 192.168.10.6 | 2018/1/23/07:45 | I |

Vehicle configuration information update history table

| ECU-ID | History content | Date and time |
|---|---|---|
| 001 | Update program reception start | 2018/3/20/18:01 |
| 001 | J | 2018/3/20/18:13 |
| 001 | Operating region switching | 2018/3/20/18:14 |
| 001 | Completion notification | 2018/3/20/18:15 |
| 002 | Update program reception start | 2018/1/23/07:39 |
| 002 | J | 2018/1/23/07:43 |
| 002 | Operating region switching | 2018/1/23/07:44 |
| 002 | Completion notification | 2018/1/23/07:45 |
| 003 | Update program reception start | 2018/3/25/11:31 |
| 003 | ..... | ..... |
| 004 | ..... | ..... |

Legend
A= Manufacturing number (serial number)
B= ECU part number (model number)
C= Number of operating regions
D= First region
E= Second region
F= Previous update completion date and time
G= Reprogramming status
H= Complete
I= Being updated
J= Update program reception completion

FIG. 10

Vehicle configuration information master table

| ECU-ID | Manufacturing number (serial number) | ECU part number (model number) | Software part number | Current version | Old version | Number of operating regions | Operating region |
|---|---|---|---|---|---|---|---|
| 001-1 | SN-ABC-0120 | AAAA | swaaa | 3.51 | 3.44 | 1 | A |
| 001-2 | SN-ABC-0120 | AAAA | swxxx | 2.33 | 2.32 | 1 | A |
| 002 | SN-XCC-9999 | BBBB | swbbb | 4.2d | 4.2c | 2 | B |
| 003 | ... | | | | | | |
| 004 | ..... | | | | | | |

| MAC address | IP address | C | Functional group | Previous update completion date and time | F |
|---|---|---|---|---|---|
| f2-23-xx-15-fc-xx | 192.168.10.5 | AES128 | D | 2018/3/20/18:15 | Complete |
| f2-23-xx-15-fc-xx | 192.168.10.5 | AES128 | D | 2018/3/19/13:45 | Complete |
| ab-xx-55-23-ac-xx | 192.168.10.6 | SHA-256 | E | 2018/1/23/07:45 | Being updated |
| | | | | | |
| | | | | | |

Legend
A= First region
B= Second region
C= Cryptosystem
D= Driving assistance
E= Information
F= Reprogramming status

ON-BOARD UPDATE DEVICE, UPDATE PROCESSING PROGRAM, PROGRAM UPDATE METHOD, AND ON-BOARD UPDATE SYSTEM

CROSS-REFERENCE TO RELATED APPLICATIONS

This application is the U.S. national stage of PCT/JP2019/040360 filed on Oct. 15, 2019, which claims priority of Japanese Patent Application No. JP 2018-194530 filed on Oct. 15, 2018, the contents of which are incorporated herein.

TECHNICAL FIELD

The present disclosure relates to an on-board update device, an update processing program, a program update method, and an on-board update system.

BACKGROUND

Vehicles are provided with on-board ECUs (Electronic Control Units) for controlling on-board devices such as a power train system for controlling an engine and so on, and a body system for controlling an air conditioner and so on. The on-board ECUs include computation processing units such as MPUs, rewriteable nonvolatile storage units such as RAMs, and communication units for communicating with other on-board ECUs, and control on-board devices by reading and executing control programs stored in the storage units. Furthermore, relay devices that have wireless communication functionality are mounted in the vehicles. It is possible to communicate with a program providing device that is connected to a network outside the vehicle, via the relay device, download (receive) a control program for the on-board ECUs from the program providing device, and update a control program for the on-board ECUs (for example, see JP 2017-97851A).

A relay device according to JP 2017-97851A is problematic in that no consideration is given regarding how to address a case in which the on-board ECU is replaced with another one while transmission between the relay device and the on-board ECU is interrupted during the processing performed to transmit a downloaded control program to the on-board ECU.

An object of the present disclosure is to provide an on-board update device and so on that can appropriately address a case in which, when a program for an on-board ECU is to be updated, the on-board ECU is replaced with another one during the interruption of the transmission between the on-board update device and the on-board ECU.

SUMMARY

An on-board update device according to one aspect of the present disclosure is an on-board update device that acquires an update program transmitted from an external server located outside a vehicle, and performs processing to update a program for an on-board ECU provided in the vehicle, the on-board update device including a control unit that controls transmission of the update program to the on-board ECU, wherein, when the transmission is to be resumed after an interruption of the transmission, if identification information of the on-board ECU is different from the identification information before the interruption of the transmission, the control unit determines that the on-board ECU has been replaced during the interruption of the transmission, and performs predetermined processing.

First, embodiments of the present disclosure will be listed and described. At least one or more of the embodiments described below may be combined together in any manner.

An on-board update device according to one aspect of the present disclosure is an on-board update device that acquires an update program transmitted from an external server located outside a vehicle, and performs processing to update a program for an on-board ECU provided in the vehicle, the on-board update device including a control unit that controls transmission of the update program to the on-board ECU, wherein, when the transmission is to be resumed after an interruption of the transmission, if identification information of the on-board ECU is different from the identification information before the interruption of the transmission, the control unit determines that the on-board ECU has been replaced during the interruption of the transmission, and performs predetermined processing.

According to this aspect, when the transmission is to be resumed after an interruption of the transmission, if identification information of the on-board ECU is different from the identification information before the interruption of the transmission, the control unit determines that the on-board ECU has been replaced during the interruption of the transmission, and performs predetermined processing. Therefore, it is possible to appropriately address the case in which the on-board ECU has been replaced.

In the on-board update device according to one aspect of the present disclosure, the predetermined processing to be performed by the control unit is processing performed to transmit information regarding the determination to the external server or a display device provided in the vehicle.

According to this aspect, when the transmission is to be resumed after an interruption of the transmission, if identification information of the on-board ECU is different from the identification information before the interruption of the transmission, the control unit determines that the on-board ECU has been replaced during the interruption of the transmission, and transmits the result of the determination to the external server or a display device provided in the vehicle. Therefore, it is possible to transmit a notification regarding the result of the determination.

In the on-board update device according to one aspect of the present disclosure, the predetermined processing to be performed by the control unit is processing performed to store information regarding the determination.

According to this aspect, when the transmission is to be resumed after an interruption of the transmission, if identification information of the on-board ECU is different from the identification information before the interruption of the transmission, the control unit determines that the on-board ECU has been replaced during the interruption of the transmission, and stores the result of the determination in a storage unit of the on-board update device. Therefore, it is possible to save the result of the determination.

In the on-board update device according to one aspect of the present disclosure, the predetermined processing to be performed by the control unit is processing performed to cancel the transmission of the update program.

According to this aspect, when the transmission is to be resumed after an interruption of the transmission, if identification information of the on-board ECU is different from the identification information before the interruption of the transmission, the control unit determines that the on-board ECU has been replaced during the interruption of the transmission, and cancels the transmission of the update program. Therefore, it is possible to prevent the update program from being received by the on-board ECU after the replacement.

In the on-board update device according to one aspect of the present disclosure, when the transmission is to be resumed after an interruption of the transmission, if a predetermined item included in the identification information of the on-board ECU and a predetermined item included in the identification information before the interruption of the transmission are the same, the control unit resumes the transmission of the update program from the beginning, and if a predetermined item included in the identification information of the on-board ECU and a predetermined item included in the identification information before the interruption of the transmission are not the same, the control unit cancels the transmission of the update program.

According to this present aspect, the control unit resumes the transmission of the update program from the beginning or cancels the transmission of the update program based on whether the predetermined items included in the pieces of identification information are the same or different. Therefore, it is possible to appropriately address the case in which the on-board ECU has been replaced during the interruption of the transmission.

In the on-board update device according to one aspect of the present disclosure, the predetermined item included in the identification information of the on-board ECU is information regarding an ECU part number of the on-board ECU.

According to this aspect, the predetermined item included in the identification information of the on-board ECU is information regarding an ECU part number of the on-board ECU. Therefore, even when the on-board ECU has been replaced during the interruption of the transmission, if the ECU part number of the on-board ECU after the replacement is the same as the part number of the on-board ECU at the interruption of the transmission, the control unit resumes the transmission of the update program from the beginning. Therefore, it is possible to even more appropriately address the case in which the on-board ECU has been replaced during the interruption of the transmission. Note that, when the transmission is to be resumed from the beginning, the on-board update device may establish a programming session between the on-board update device and the on-board ECU, and thereafter resume the transmission of the update program (data transfer) from the beginning.

In the on-board update device according to one aspect of the present disclosure, when the transmission is to be resumed after an interruption of the transmission, if the identification information of the on-board ECU is the same as the identification information before the interruption of the transmission, the control unit resumes the transmission of the update program.

According to this aspect, when the transmission is to be resumed after an interruption of the transmission, if the identification information of the on-board ECU is the same as the identification information before the interruption of the transmission, the control unit resumes the transmission of the update program. Therefore, it is possible to reliably update the program for the on-board ECU.

In the on-board update device according to one aspect of the present disclosure, the control unit stores information regarding a transmission status of the update program transmitted to the on-board ECU, if the transmission is interrupted, acquires information regarding a reception status of the update program received from the on-board ECU, if the information regarding the transmission status and the acquired information regarding the reception status are consistent with each other, resumes the transmission of the update program to the on-board ECU from an interruption point that is determined based on the information regarding the transmission status or the information regarding the reception status, and if the information regarding the transmission status and the acquired information regarding the reception status are not consistent with each other, resumes the transmission of the update program to the on-board ECU from the beginning.

According to this aspect, if the information regarding the transmission status and the acquired information regarding the reception status are not consistent with each other, the control unit resumes the transmission of the program to the on-board ECU from an interruption point at which the transmission has been interrupted. Therefore, it is possible to efficiently resume the transmission.

An update processing program according to one aspect of the present disclosure causes a computer to carry out processing to: acquire an update program transmitted from an external server located outside a vehicle; transmit the update program to an on-board ECU; and when the transmission is to be resumed after an interruption of the transmission, if identification information of the on-board ECU is different from the identification information before the interruption of the transmission, determine that the on-board ECU has been replaced during the interruption of the transmission, and perform predetermined processing.

According to this aspect, it is possible to enable a computer to function as an on-board update device.

A method for updating a program according to one aspect of the present disclosure comprising: acquiring an update program transmitted from an external server located outside a vehicle; transmitting the update program to an on-board ECU; and when the transmission is to be resumed after an interruption of the transmission, if identification information of the on-board ECU is different from the identification information before the interruption of the transmission, determining that the on-board ECU has been replaced during the interruption of the transmission, and performing predetermined processing.

According to this aspect, when a program for the on-board ECU is to be updated, if the on-board ECU has been replaced during an interruption of the transmission between an on-board update device and the on-board ECU, it is possible to appropriately address such a case.

An on-board update system according to one aspect of the present disclosure is an on-board update system to be provided in a vehicle, including: a vehicle exterior communication device that acquires an update program transmitted from an external server located outside a vehicle; an on-board update device that acquires an update program transmitted from the external server via the vehicle exterior communication device; and an on-board ECU that updates a program, using the update program transmitted from the on-board update device, wherein the on-board update device includes a control unit that controls transmission of the update program to the on-board ECU, and when the transmission is to be resumed after an interruption of the transmission, if identification information of the on-board ECU is different from the identification information before the interruption of the transmission, the control unit determines that the on-board ECU has been replaced during the interruption of the transmission, and performs predetermined processing.

According to this aspect, when a program for the on-board ECU is to be updated, if the on-board ECU has been replaced during an interruption of the transmission between an on-board update device and the on-board ECU, it is possible to appropriately address such a case.

Advantageous Effects of Present Disclosure

According to one aspect of the present disclosure, it is possible to provide an on-board update device and so on that can appropriately address a case in which, when a program for an on-board ECU is to be updated, the on-board ECU is replaced with another one during the interruption of the transmission between the on-board update device and the on-board ECU.

BRIEF DESCRIPTION OF DRAWINGS

FIG. 2 is a block diagram illustrating configurations of an on-board update device and so on.

FIG. 3 is an illustration diagram illustrating an aspect of configuration information regarding an on-board ECU.

FIG. 10 is an illustration diagram illustrating an aspect of configuration information regarding an on-board ECU.

DETAILED DESCRIPTION OF PREFERRED EMBODIMENTS

The following specifically describes the present disclosure based on drawings that illustrate embodiments thereof. An on-board update device 2 according to embodiments of the present disclosure will be described below with reference to the drawings. Note that the present disclosure is not limited to the examples, but is indicated by the claims, and is intended to include all modifications within the meaning and scope equivalent to the scope of the claims.

First Embodiment

Figure 1:
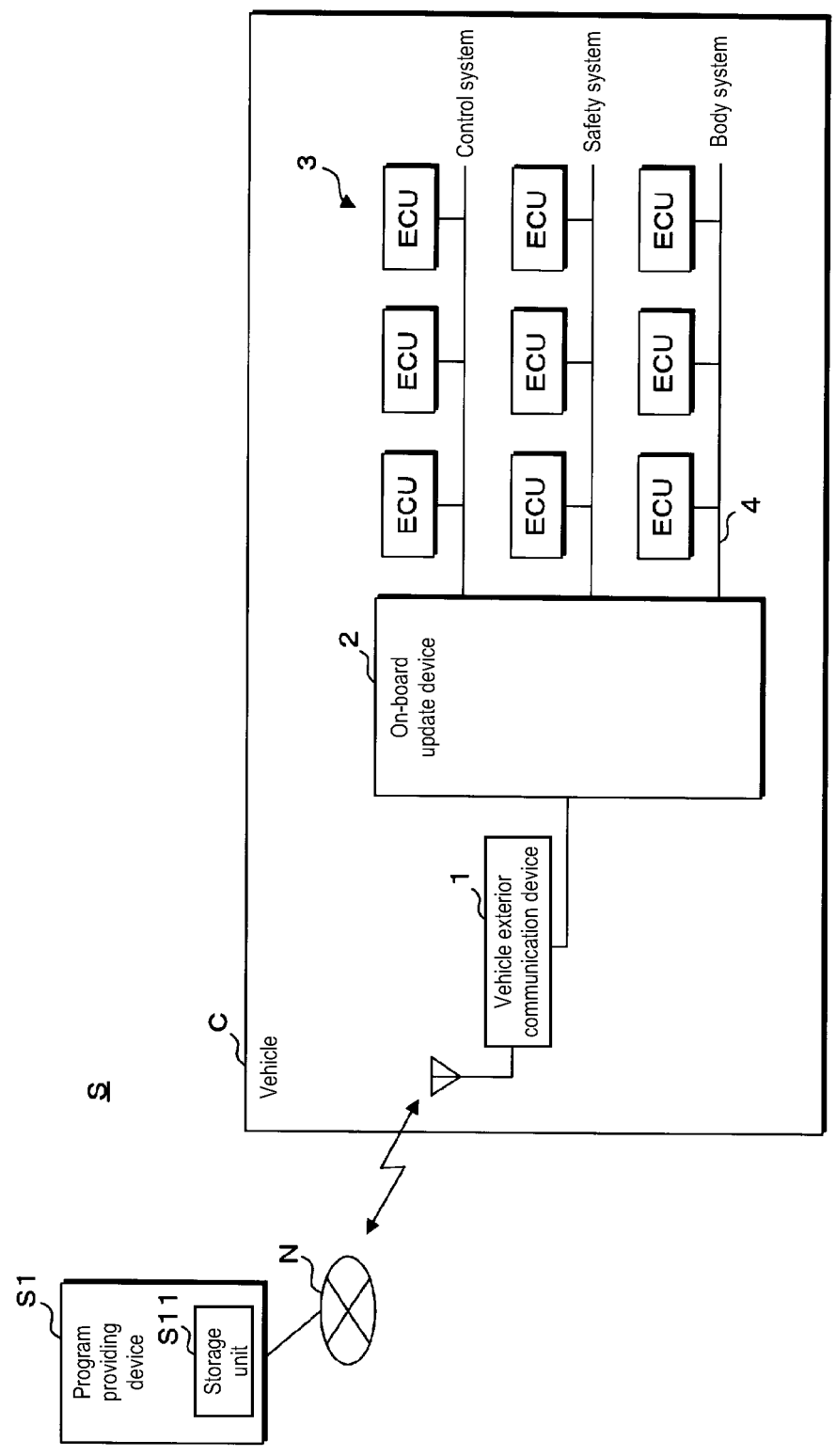
FIG. 1 is a schematic diagram illustrating a configuration of an on-board update system according to a first embodiment.
Figure 2:
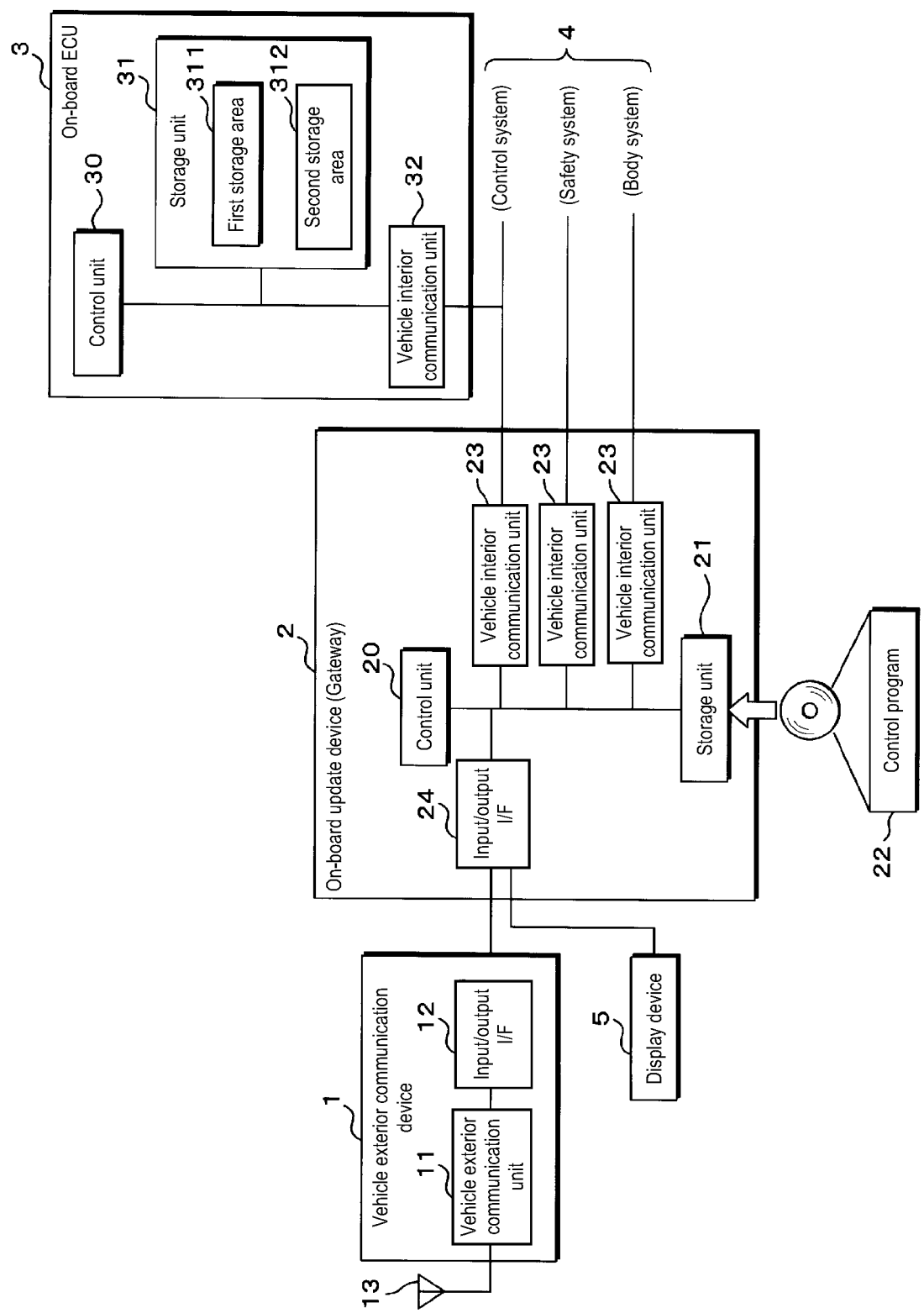

The following describes an embodiment based on the drawings. FIG. 1 is a schematic diagram showing a configuration of an on-board update system according to a first embodiment. FIG. 2 is a block diagram showing configurations of an on-board update device 2 and so on. An on-board update system S includes a vehicle exterior communication device 1 and an on-board update device 2 that are provided in a vehicle C, and transmits a program or data acquired from a program providing device S1 that is connected to the on-board update system S via a vehicle exterior network N, to an on-board ECU (Electronic Control Unit) 3 provided in the vehicle C.

The program providing device S1 is a computer such as a server connected to the vehicle exterior network N such as the Internet or a public network, and includes a storage unit S11 formed using a RAM (Random Access Memory), a ROM (Read Only Memory), or a hard disk or the like. The program providing device S1 corresponds to the external server located outside the vehicle. In the program providing device S1, a program or data for controlling an on-board ECU 3, created by the manufacturer or the like of the on-board ECU 3, is stored in the storage unit S11 (the predetermined storage area). The program or data is transmitted to the vehicle C as an update program as described below, and is used to update a program or data for an on-board ECU 3 provided in the vehicle C. The program providing device S1 (the external server) with such a configuration is also referred to as an OTA (Over The Air) server. An on-board ECU 3 provided in the vehicle acquires an update program transmitted from the program providing device S1 via wireless communication, adopts the update program as a program to be executed, and is thus able to update the program to be executed by the ECU (reprogram).

Hereinafter, the program is described as a program that includes: a program code that includes control syntax that is to be used by an on-board ECU 3 to perform processing; and an external file that contains data to be referred to when the program code is executed. When the update program is transmitted, an external file that contains such a program code and data is transmitted from the program providing device S1 as, for example, encrypted archive file.

The vehicle C is provided with the vehicle exterior communication device 1, the on-board update device 2, a display device 5, and a plurality of on-board ECUs 3 for controlling various on-board devices. The vehicle exterior communication device 1 and the on-board update device 2 are connected via a harness such as a serial cable harness so as to be able to communicate with each other. The on-board update device 2 and the on-board ECU 3 are connected via a vehicle interior LAN 4 that conforms to a communication protocol such as a CAN (Control Area Network (registered trademark)) or Ethernet (registered trademark) so as to be able to communicate with each other.

The vehicle exterior communication device 1 includes a vehicle exterior communication unit 11, and an input/output I/F (interface) 12 for communicating with the on-board update device 2. The vehicle exterior communication unit 11 is a communication device for performing wireless communication using a mobile communication protocol such as 3G, LTE, 4G, or WiFi, and transmits data to, and receives data from, the program providing device S1 via an antenna 13 connected to the vehicle exterior communication unit 11. Communication between the vehicle exterior communication device 1 and the program providing device is performed via an external network such as a public network or the Internet, for example.

The input/output I/F 12 is a communication interface for perform, for example, serial communication with the on-board update device 2. The vehicle exterior communication device 1 and the on-board update device 2 communicate with each other via the input/output I/F 12 and a harness such as a serial cable harness connected to the input/output I/F 12. In the present embodiment, the vehicle exterior communication device 1 and the on-board update device 2 are separate devices and are connected via the input/output I/F 12 so as to be able to communicate with each other. However, the present disclosure is not limited to such a configuration. The vehicle exterior communication device 1 may be built into the on-board update device 2 as one constitutional part of the on-board update device 2.

The on-board update device 2 includes a control unit 20, a storage unit 21, and vehicle interior communication units 23. The on-board update device 2 is configured to acquire an update program that the vehicle exterior communication device 1 has received from the program providing device S1 via wireless communication, from the vehicle exterior communication device 1, and transmit the update program to a predetermined on-board ECU 3 (the update-target on-board ECU 3) via a vehicle interior LAN 4. The on-board update device 2 is a gateway (a relay device) that generally controls segments of a plurality of systems such as an on-board ECU 3 of a control system, an on-board ECU 3 of a safety system, and an on-board ECU 3 of a body system, for example, and relays communication between the on-board ECUs 3 of these segments. Alternatively, the on-board update device 2 may be configured as one functional unit of the body ECU that controls the entirety of the vehicle C.

The control unit 20 is formed using a CPU (Central Processing Unit), a MPU (Micro Processing Unit), or the like, and is configured to perform various kinds of control processing, computation processing, and the like by reading out and executing a control program and data stored in the storage unit 21 in advance. The control unit 20 corresponds to the acquisition unit that acquires the update program transmitted from the program providing device S1, via the vehicle exterior communication device 1.

The storage unit 21 is formed using a volatile memory device such as a RAM (Random Access Memory) or a nonvolatile memory device such as a ROM (Read Only Memory), an EEPROM (Electrically Erasable Programmable ROM), or a flash memory, and a control program and data to be referred to at the time of processing are stored therein in advance. The control program stored in the storage unit 21 may be a control program that has been read out from a recording medium 22 that can be read by the on-board update device 2, and has been stored in the storage unit 21. Also, the control program may be a control program downloaded from an external computer (not shown) connected to a communication network (not shown), and stored in the storage unit 21. Furthermore, configuration information regarding all the on-board ECUs 3 provided in the vehicle C is stored in the storage unit 21 (the predetermined storage area). The storage unit 21 stores the update program acquired from the program providing device S1, and information regarding the progress of transmission of the update program to the on-board ECU 3.

The vehicle interior communication units 23 are input/output interfaces that employ a communication protocol such as a CAN (Control Area Network) or Ethernet (registered trademark), and the control unit 20 communicates with the on-board ECUs 3 that are connected to the vehicle interior LAN 4 or another on-board device such as a relay device with each other via the vehicle interior communication units 23. A plurality of vehicle interior communication units 23 (three in the drawing) are provided, and communication lines that constitute the vehicle interior LAN 4 are respectively connected to the vehicle interior communication units 23. In this way, the vehicle interior LAN 4 is divided into a plurality of segments by providing a plurality of vehicle interior communication units 23, and each on-board ECU is connected to any of the segments according to the function (the control system function, the safety system function, or the body system function) of the on-board ECU.

Each on-board ECU 3 includes a control unit 30, a storage unit 31, and a vehicle interior communication unit 32. The storage unit 31 is formed using a volatile memory device such as a RAM (Random Access Memory) or a nonvolatile memory device such as a ROM (Read Only Memory), an EEPROM (Electrically Erasable Programmable ROM), or a flash memory, and a program or data for the on-board ECU 3 is stored therein. This program or data is the update target that is to be updated with the update program transmitted from the on-board update device 2.

The storage unit 31 includes a first storage area (a first region) 311 and a second storage area (a second region) 312. The storage unit 31 stores two programs, namely a program (a current version) that is currently executed (adopted) by the on-board ECU 3 and a program (an old version) that has been adopted before the current version. The current version of the program and the old version of the program are separately stored in the first storage area 311 and the second storage area 312. That is to say, if the current version of the program is stored in the first storage area 311, the old version of the program is stored in the second storage area 312. If the old version of the program is stored in the first storage area 311, the current version of the program is stored in the second storage area 312. In this way, by storing two programs, i.e. the current version and the old version, in the form of a so-called "two region storage", even if a problem occurs in the current version of the program, the control unit 30 reads and executes (switches to) the old version of the program that has been adopted previously and has been running normally. Thus, it is possible to enhance the reliability of the on-board ECU 3.

The storage unit 31 stores information regarding the versions of the two programs, namely the current version and the old version, and information regarding the area (the operating region) in which the currently executed (adopted) program is stored. That is to say, if the program stored in the first storage area (the first region) 311 is currently executed, the storage unit 31 stores information indicating that the operating region is the first storage area (the first region) 311. If the program stored in the second storage area (the second region) 312 is currently executed, the storage unit 31 stores information indicating that the operating region is the second storage area (the second region) 312. The storage unit 31 stores information regarding the configuration of the ECU thereof, information regarding the progress of reception of an update program from the on-board update device 2, and information regarding the update history of one or more updates performed in the past, including information regarding the version of the program (the current version and the old version) and information regarding the operating region.

The control unit 30 is formed using a CPU (Central Processing Unit), a MPU (Micro Processing Unit), or the like, and performs control processing and the like by reading out and executing a control program and data stored in the storage unit 31 (the operating region) so that on-board devices, including the on-board ECU 3, or actuators or the like, are controlled.

The control unit 30 of the on-board ECU 3 receives an update program transmitted from the on-board update device 2, via the vehicle interior communication unit 32, and acquires the update program. Therefore, the control unit 30 of the ECU 3 acquires the update program transmitted from the program providing device S1, via the vehicle exterior communication device 1 and the on-board update device 2. The control unit 30 stores the acquired update program in the storage area that is not the operating region (the first storage area 311 or the second storage area 312). That is to say, when the control unit 30 is to acquire the update program transmitted from the on-board update device 2, the control unit 30 deletes the program stored in the storage area that is not the operating region (non-operating region), as preparatory processing for the acquisition. Usually, the program stored in the storage area that is not the operating region is an old version of the program that has been executed before the current version of the program, and therefore the old version can be deleted without stopping the function of the on-board ECU 3 of controlling on-board devices. The control unit 30 deletes the old version of the program stored in the storage area (non-operating region) that is not the operating region, and stores the update program transmitted from the on-board update device 2 in the non-operating region.

Although details will be described later, the transmission of the update program from the on-board update device 2 is performed in units of blocks divided from the update program, each having a predetermined data size, for example. Each block to be transmitted has a block ID for identifying the block, and the control unit 30 of the on-board ECU 3 stores the received block ID in the storage unit 31. Thus, the store unit 31 can store information regarding the progress of reception of the update program.

After the reception of the update program is completed normally, i.e. after the reception of all of the divided blocks is complete, upon a predetermined operation such as the IG switch of the vehicle C being switched ON and OFF, the control unit 30 of the on-board ECU 3 performs switching of the operating region, and adopts and executes the received update program as the current version of the program. Upon the reception of the update program being completed normally, or the switching of the operating region having been normally performed, the control unit 30 of the on-board ECU 3 may store information indicating that the update of the program has finished (has been completed normally) in the storage unit 31, and also transmit the information to (notify) the on-board update device 2.

The display device 5 is an HMI (Human Machine Interface) device such as a display of a car navigation system, for example. The display device 5 is connected to an input/output I/F 24 of the on-board update device 2 via a harness such as a serial cable harness so as to be able to communicate with each other. The display device 5 displays data or information output from the control unit 20 of the on-board update device 2 via the input/output I/F 24. The display device 5 and the on-board update device 2 do not necessarily have to be connected via the input/output I/F 24 or the like, and the display device 5 and the on-board update device 2 may be connected via the vehicle interior LAN 4.

FIG. 3 is an illustration diagram illustrating an aspect of configuration information regarding each on-board ECU 3. Upon the IG (ignition) switch being turned on, or at a predetermined time, the control unit 20 of the on-board update device 2 requests that every on-board ECU 3 invariably mounted in the vehicle C transmit configuration information (vehicle configuration information) regarding the on-board ECU 3 and the update history of the configuration information (vehicle configuration information update history) to the control unit 20, acquires the configuration information and the update history thus transmitted, and stores them in the storage unit 21. Alternatively, the control unit 20 of the on-board update device 2 may acquire the configuration information and the update history autonomously transmitted from the on-board ECUs 3, and store them in the storage unit 21, without requesting that the on-board ECUs 3 transmit the configuration information and the update history of the on-board ECUs 3 to the control unit 20. As described above, the storage unit 31 of each on-board ECU 3 stores the configuration information and the update history thereof. Therefore, the on-board update device 2 collects the configuration information and the update history stored in each on-board ECU 3, and stores the configuration information and the update history of each on-board ECU 3.

The on-board update device 2 may transmit the configuration information and the update history of each on-board ECU 3 thus collected and stored, to the program providing device S1. By transmitting the configuration information and the update history to the program providing device S1, it is possible to back up the configuration information and the update history in the storage unit S11 of the program providing device S1.

As shown in FIG. 3, configuration information regarding the on-board ECUs 3 (a vehicle configuration information master table) includes, for example, the manufacturing number (serial number), the ECU part number (the part number, the model number), the software part number, the current version of the program, the old version of the program, the number of operating regions, the operating region, the MAC (Media Access Control) address, the IP address, the previous update completion date and time, and the reprograming status of each on-board ECU 3, and such pieces of information are managed in association with the respective ECU-IDs of the on-board ECU 3, which are sequential numbers set so as not to be duplicate.

The manufacturing number (serial number) is a number given to the on-board ECU 3 when the on-board ECU 3 is manufactured, and is composed of a lot number indicating the production base or the like, a sequential number at the time of manufacturing, and so on. The manufacturing number is a number that can uniquely specify the ECU. The ECU part number (the part number, the model number) is a number that specifies the type of the on-board ECU, and is a component number, for example. The software part number is a number for specifying the type of software of the update program.

The number of operating regions is the number of storage areas that store different versions of the update program. That is to say, when the number of operating regions is two, two different versions of the update program can be recorded. When the number of operating regions is one, only one version of the update program can be stored. The operating region is information specifying the storage region (either the first storage area 311 or the second storage area 312) in which the program that is currently executed (adopted) by the on-board ECU 3 is stored.

The current version is the version number of the program that is currently executed (adopted) by the on-board ECU 3, and the version number of the program stored in the operating region. The old version is the version number of the program that has previously been executed (adopted) by the on-board ECU 3, and the version number of the program stored in the non-operating region (the storage area that is not the operating region).

The MAC address is an address corresponding to the data link layer when the vehicle interior communication unit 23 of the on-board ECU 3 is a communication port that supports Ethernet. The MAC address is a number given when the vehicle interior communication unit 23 is manufactured, and is composed of a vender code that indicates the manufacturer, a sequential number at the time of manufacturing, and so on. The Mac address is a number that can uniquely specify the ECU.

The IP address is an address corresponding to the network layer used to perform communication using the TCP/IP when the vehicle interior communication unit 23 is a communication port that supports Ethernet.

The configuration information of the on-board ECU 3 includes identification information for identifying the on-board ECU 3. The IP address is an address that can be freely determined according to the setting of the vehicle interior communication unit 23, and therefore it is preferable to use the serial number or the MAC address as the identification information for identifying the on-board ECU 3. Alternatively, the identification information may include, in addition to the serial number and the MAC address, the ECU part number (the part number, the model number) of the on-board ECU 3. As a result of including the ECU part number in the identification information, it is possible to determine the identity of the on-board ECU 3 as a part. That is to say, when two pieces of configuration information are compared with each other, if the ECU part numbers are the same despite the serial numbers or the MAC addresses being different, it means that the on-board ECUs 3 that have these pieces of configuration information are identical as parts (in terms of the part number and the model number).

The previous update completion date and time are the date and time when the previous update (the transmission of an update program) was complete. The reprograming status indicates the latest status regarding updates. Note that these pieces of information retain their relevance to information regarding the update history (the vehicle configuration information update history table) described later.

As shown in the lower tier in FIG. 3, the storage unit 21 of the on-board update device 2 stores, in addition to configuration information regarding each on-board ECU 3, information regarding the update history of the configuration information. The configuration information (the vehicle configuration information master table) and the update history of the configuration information (a vehicle configuration information update management table) of each on-board ECU 3 may be registered or managed as separate tables, for example. Information regarding the update history of the configuration information includes history contents and the date and time showing when the update indicated by each history content was performed, and the history contents and the dates and times are registered or managed in association with the ECU-IDs of the on-vehicle ECUs. The history contents include, for example, several kinds of processing performed during the period from the reception of the update program to the transmission of an update completion notification (a completion notification) (starting the reception of the update program, completing the reception of the update program, switching the operating region, and notifying the completion). Also, each history content may include the version of the update program to be subjected to each kind of processing. The vehicle configuration information master table and the vehicle configuration information update management table may retain relevance to each other, and, for each on-board ECU, the reprograming status may be derived from the configuration information according to the history content as of the latest date and time.

The information included in the configuration information of each on-board ECU 3 is not limited to the information in the items shown in FIG. 3. If an on-board ECU 3 is connected via a CAN, the configuration information of the on-board ECU 3 may include a CAN-ID that is to be used (included) when the on-board ECU 3 transmits a message.

The identification information of the on-board ECU 3 includes the serial number or the MAC address included in the configuration information regarding the on-board ECU 3. The control unit 20 of the on-board update device 2 stores the identification information of the on-board ECU 3, which is based on the serial number or the MAC address included in the configuration information, and information regarding the progress of transmission of the update program to the on-board ECU 3, in the storage unit 21, in association with each other.

Figure 4:
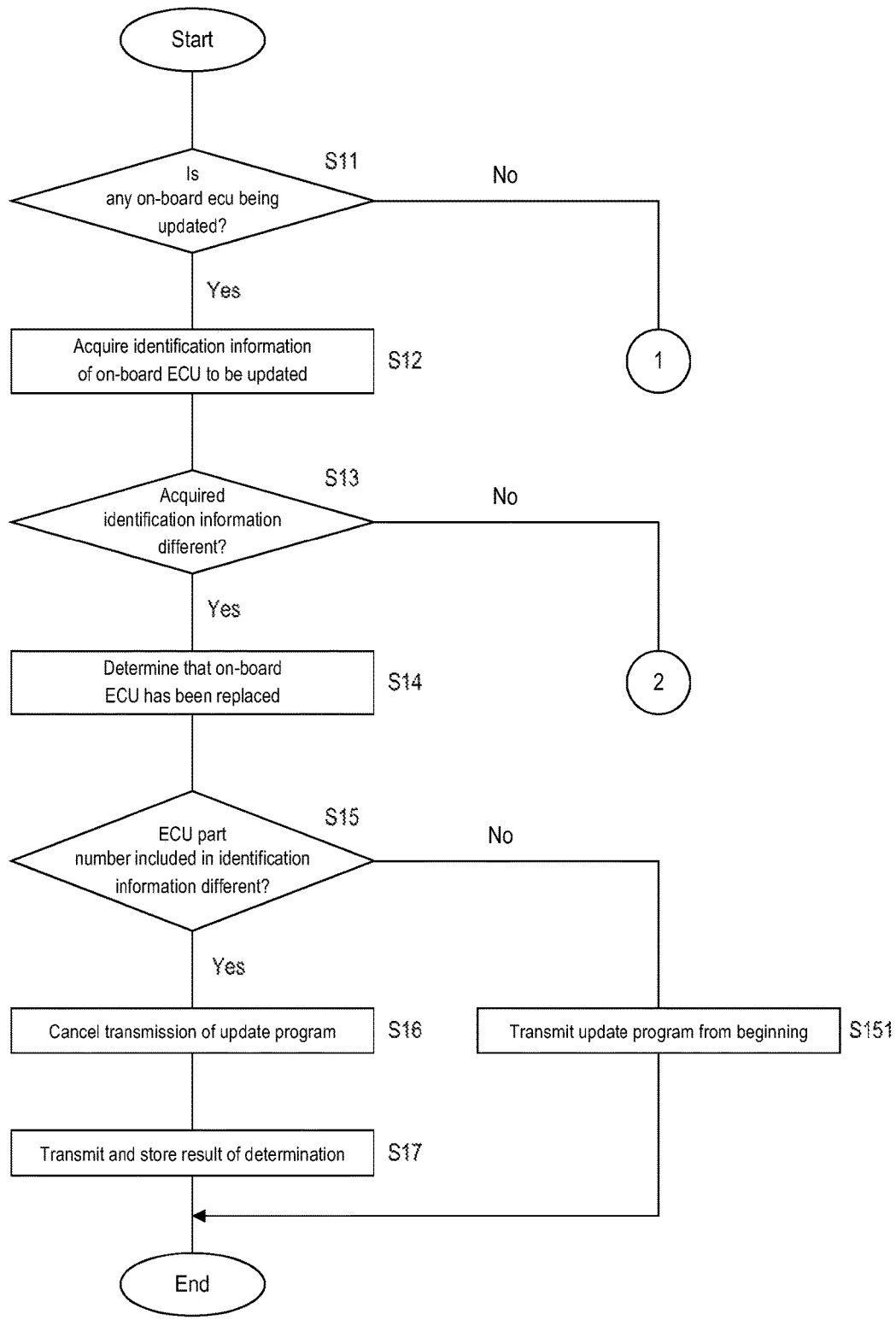
FIG. 4 is a flowchart illustrating processing that is performed by a control unit of the on-board update device.
Figure 5:
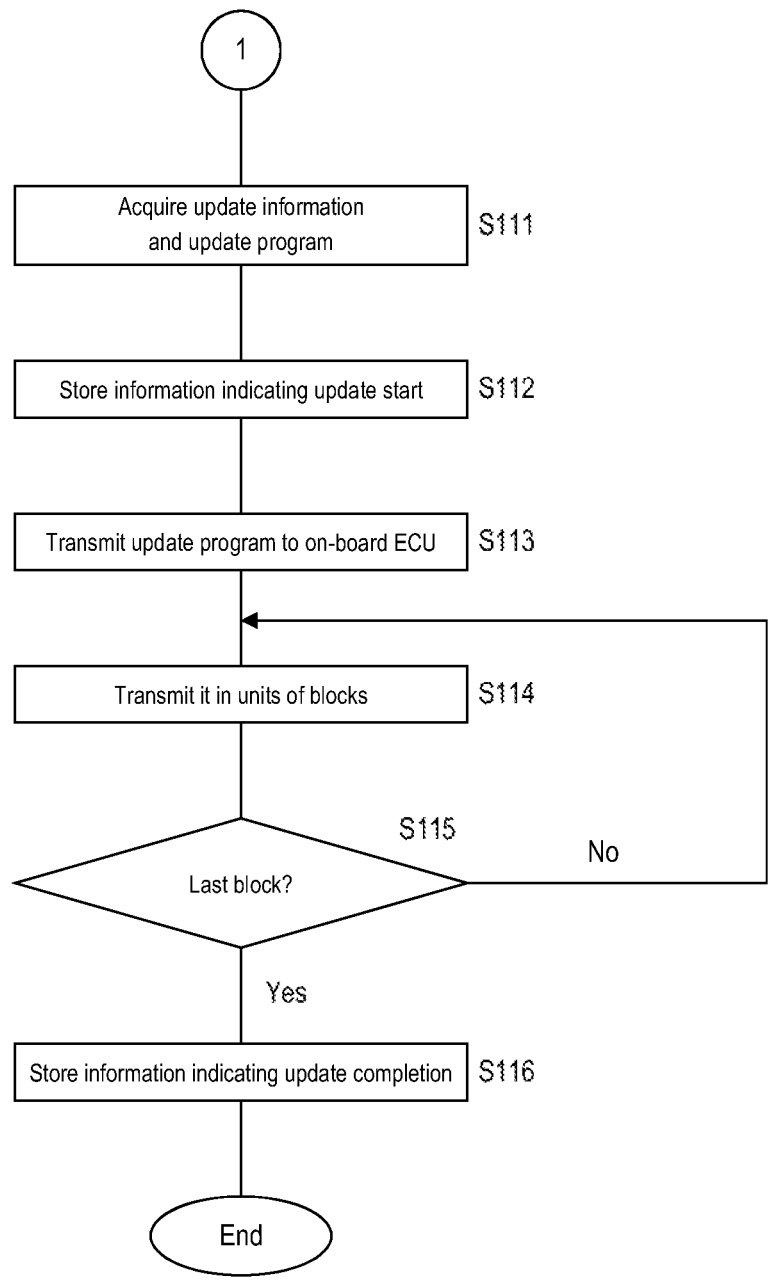
FIG. 5 is a flowchart illustrating processing that is performed by the control unit of the on-board update device.
Figure 6:
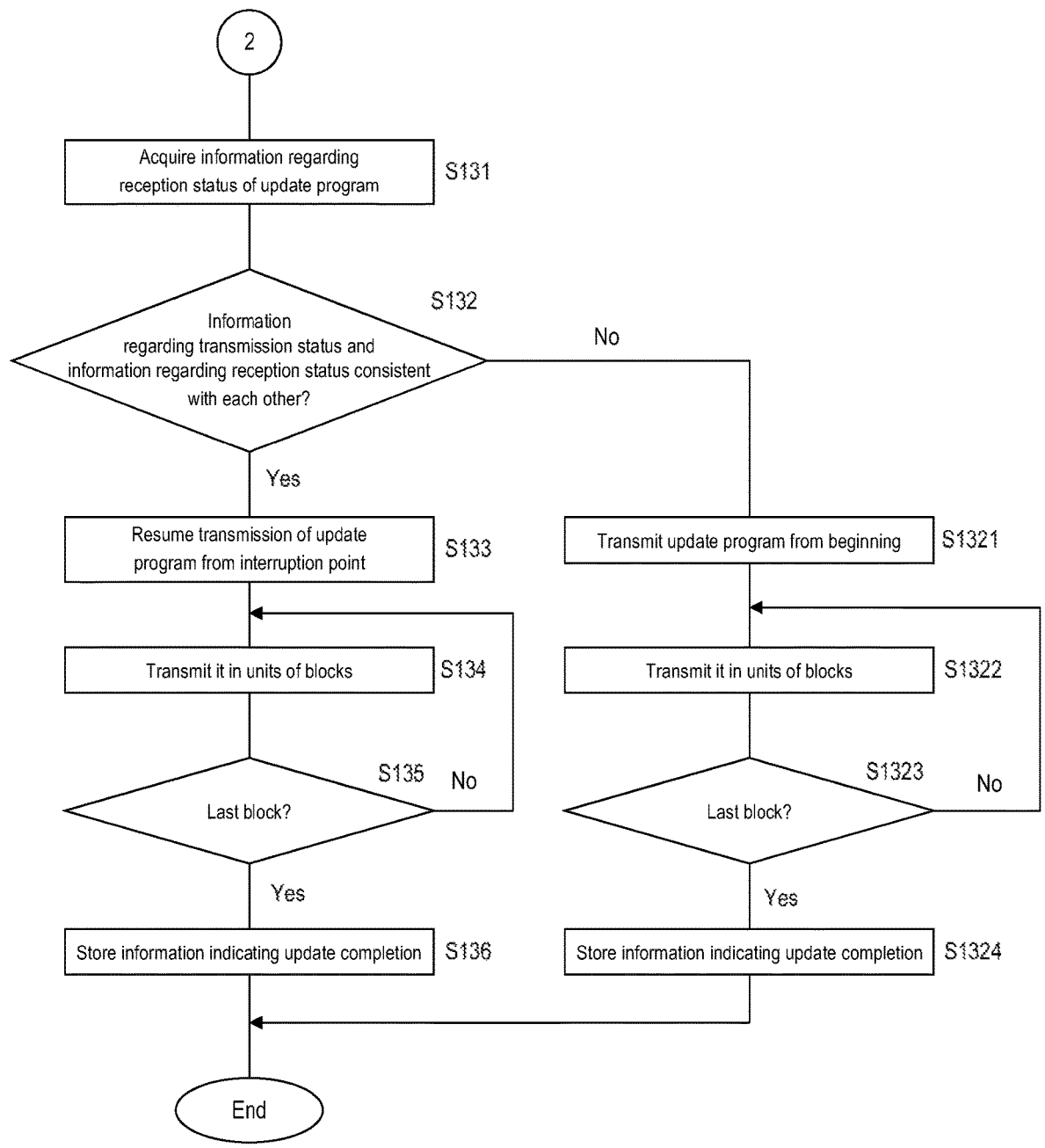
FIG. 6 is a flowchart illustrating processing that is performed by the control unit of the on-board update device.

FIG. 4 is a flowchart showing processing that is performed by the control unit 20 of the on-board update device 2. FIG. 5 is a flowchart showing processing that is performed by the control unit 20 of the on-board update device 2. FIG. 6 is a flowchart showing processing that is performed by the control unit 20 of the on-board update device 2. In a state where the vehicle C has been started up (the IG switch is ON), the control unit 20 of the on-board update device 2 regularly communicates with the program providing device S1 via the vehicle exterior communication device 1 to perform the following processing.

The control unit 20 of the on-board update device 2 determines whether or not there is an on-board ECU 3 that is being updated (S11). The control unit 20 references information regarding the progress of transmission of the previous update program stored in the storage unit 21, and determines whether or not there is an on-board ECU 3 that is being updated. Although details will be described later, information regarding the progress of transmission of the update program includes identification information specifying the on-board ECU 3 to be updated (e.g. the serial number or the MAC address) and the block ID of the transmitted update program. The information regarding the progress of transmission of the update program includes also includes information regarding whether or not the transmission of the update program to the on-board ECU 3 is complete. For example, if the block ID of the update program previously transmitted is different from the block ID of the last block of the update program to be transmitted, or if there is any on-board ECU 3 to which the transmission of the update program has not been completed, the control unit 20 determines that there is an on-board ECU 3 that is being updated. For example, if the block ID of the update program previously transmitted is the block ID of the last block of the update program to be transmitted, or if there is no on-board ECU 3 to which the transmission of the update program has not been completed, the control unit 20 determines that there is no on-board ECU 3 that is being updated.

If there is an on-board ECU 3 that is being updated (S11: YES), the control unit 20 of the on-board update device 2 acquires the identification information of the on-board ECU 3 to be updated (S12). The control unit 20 of the on-board update device 2 requests that the on-board ECU 3 to be updated transmit the ECU's own identification information thereto. The control unit 20 receives and acquires the identification information transmitted from the on-board ECU 3. The identification information transmitted from the on-board ECU 3 includes, for example, the serial number or the MAC address and the ECU part number of the on-board ECU 3. The identification information transmitted from the on-board ECU 3 may also include information regarding the version of the program for the on-board ECU 3. Alternatively, the on-board ECU 3 may transmit all the pieces of configuration information regarding the ECU, stored in the storage unit 31, to the on-board update device 2.

The control unit 20 of the on-board update device 2 determines whether or not the identification information acquired from the on-board ECU 3 to be updated is different (S13). The control unit 20 compares the identification information acquired from the on-board ECU 3 with the identification information of the on-board ECU 3 stored in the storage unit 21, indicating that the update program is being transmitted thereto, and determines whether or not these pieces of identification information are the same. To determine whether or not the pieces of identification information are the same, the control unit 20 may compare every item included in the pieces of identification information. That is to say, if each piece of identification information includes a serial number, a MAC address, and an ECU part number as predetermined items, the control unit 20 may determine that the pieces of identification information are the same when all the items, namely the serial numbers, the MAC addresses, and the ECU part numbers, are the same. If the on-board ECU 3 to be updated does not respond to the transmission request and the identification information cannot be acquired, such a case is regarded the same as the case in which the pieces of identification information are not the same, and the control unit 20 determines that the acquired pieces of identification information are not the same, i.e. are different.

Upon determining that the pieces of identification information are different (S13: YES), the control unit 20 of the on-board update device 2 determines that the on-board ECU 3 to be updated has been replaced during the interruption of the transmission of the update program (S14). If the identification information acquired from the on-board ECU 3 to be updated and the stored identification information of the on-board ECU 3, indicating that the update program is being transmitted thereto, are not the same, or the on-board ECU 3 to be updated does not respond to the transmission request and the identification information cannot be acquired, the control unit 20 determines that the on-board ECU 3 has been replaced during the interruption of the transmission of the update program. In the case in which the on-board ECU 3 to be updated does not respond to the transmission request and the identification information cannot be acquired, the control unit 20 of the on-board update device 2 may determine that the on-board ECU 3 to be updated has been replaced during the interruption of the transmission of the update program. Alternatively, the case in which the on-board ECU 3 to be updated does not respond to the transmission request and the identification information cannot be acquired, the control unit 20 may cancel the transmission of the update program.

The control unit 20 of the on-board update device 2 determines whether or not the ECU part numbers included in the pieces of identification information are different (S15). As described above, each piece of identification information includes the serial number or the MAC address that is a specific item that uniquely determines the on-board ECU 3, and the ECU part number that identifies the on-board ECU 3 as a part. The control unit 20 compares the ECU part numbers included in the identification information before the interruption of the transmission and the identification information after the resumption of the transmission, and determines whether the ECU part numbers are the same or different.

If the ECU part numbers are different (S15: YES), the control unit 20 of the on-board update device 2 cancels the transmission of the update program (S16). In this case, the on-board ECU 3 at the time the transmission is to be resumed is an on-board ECU 3 that is completely different from the on-board ECU 3 before the transmission is interrupted, having a different MAC address and a different ECU part number. Therefore, the control unit 20 determines that the on-board ECU 3 has been replaced illegitimately during the interruption of the transmission, and cancels the transmission of the update program without resuming the transmission of the update program to the on-board ECU 3 to be updated.

If the ECU part numbers are not different (S15: NO), i.e., if the ECU part numbers are the same, the control unit 20 of the on-board update device 2 transmits the update program from the beginning (S151). Although the serial number or the MAC address is different in the identification information before the interruption and in the identification information at the time of resumption, the ECU part numbers may be the same. In such a case, the on-board ECU 3 has been replaced during the interruption of the transmission, but the on-board ECUs 3 before and after the replacement are parts having the same model number or the same part number. Therefore, the control unit 20 determines that the on-board ECU 3 has been legitimately replaced during the interruption of the transmission, and transmits the update program for the on-board ECU 3 to be updated, from the beginning, to resume the transmission. When transmitting the update program from the beginning, the control unit 20 may transmit the update program in units of blocks as in steps S114, S115, and S116 described below, and store information indicating the completion of the update, in the storage unit 21, after transmitting all the blocks.

The control unit 20 of the on-board update device 2 transmits and stores the result of the determination (S17). The control unit 20 transmits the result of the determination indicating that the on-board ECU 3 to be updated is replaced or removed during the interruption of the transmission of the update program, to the program providing device S1 outside the vehicle, the display device 5 provided in the vehicle C, or both the program providing device S1 and the display device 5 provided in the vehicle C, to notify them of the replacement or removal. The control unit 20 may include the identification information of the on-board ECU 3 stored in the storage unit 21, indicating that the update program is being transmitted thereto, in the result of the determination, and transmit it to make a notification. Alternatively, the control unit 20 may include the result of the determination regarding whether or not the ECU part numbers are the same, in the above-described result of the determination. Alternatively, the control unit 20 may also transmit the identification information of the on-board ECU 3 that has been determined having been replaced during the interruption of the transmission of the update program (the identification information received from the on-board ECU 3 after the replacement) to make a notification. Alternatively, the control unit 20 of the on-board update device 2 may transmit a mobile terminal such as a smartphone belonging to the operator of the vehicle C via the vehicle exterior communication device 1, to notify the operator of the fact that the on-board ECU 3 to be updated has been replaced or removed. The control unit 20 stores, in the storage unit 21, information indicating that the on-board ECU 3 to be updated has been replaced or removed, as well as the received identification information or information indicating that identification information has not be received, in association with the configuration information regarding the on-board ECU 3, indicating that the update program is being transmitted.

When there is no on-board ECU 3 that is being updated (S11: NO), the control unit 20 of the on-board update device 2 acquires update information and the update program (S111). The control unit 20 of the on-board update device 2 communicates with the program providing device S1 via the vehicle exterior communication device 1 to check whether or not there is update information, and if there is update information, the control unit 20 acquires the update program corresponding thereto. The control unit 20 specifies the on-board ECU 3 to be updated, based on the acquired update information. Update information is not limited to being a data file that is separate from the update program. Update information may be included in a data file of the update program, as header information, for example.

The control unit 20 of the on-board update device 2 stores information indicating the start of the update (S112). The control unit 20 stores information indicating that the update of the on-board ECU 3 has been started (the on-board ECU 3 is being updated) in the storage unit 21 in association with the identification information of the on-board ECU 3 to be updated.

The control unit 20 of the on-board update device 2 transmits the update program to the on-board ECU 3 (S113). The control unit 20 starts transmitting the update program. When starting the transmission of the update program, the control unit 20 may establish a session with the on-board ECU 3 that is the destination of the transmission. In S11, although the control unit 20 specifies the on-board ECU 3 to be updated, based on the acquired update information, the present disclosure is not limited in this way. For example, the control unit 20 transmits a predetermined packet or message generated based on the update information to all the on-board ECUs 3 provided in the vehicle C through multicasting. Thereafter, the control unit 20 may specify the on-board ECU 3 that has responded to the multicasting with the configuration information thereof as the on-board ECU 3 to be updated, and store information indicating that the update of the on-board ECU 3 has been started (the on-board ECU 3 is being updated) in the storage unit 21.

The control unit 20 of the on-board update device 2 transmits the update program to the on-board ECU 3 in units of blocks (S114). The control unit 20 transmits the update program in units of blocks divided from the update program, each having a predetermined data size. Alternatively, the control unit 20 may extract separators included in the update program, and divides the update program into blocks based on the separators. Each block is provided with a block ID that is used to identify the block. The control unit 20 stores the block ID of the transmitted block, and information regarding the progress of transmission (transmission status) of the update program, which includes the transmission time point, in the storage unit 21.

The control unit 20 of the on-board update device 2 determines whether or not the block transmitted this time is the last block (S115). For example, when dividing the update program into blocks each having a predetermined size, the control unit 20 confirms the number of blocks to be generated. The confirmed number of blocks is the last number of the block ID, and the control unit 20 determines whether or not the block ID of the block to be transmitted this time is the last number, thereby determining whether or not the block is the last block to complete the transmission of the update program.

If the block transmitted this time is not the last block (S115: NO), the control unit 20 of the on-board update device 2 performs loop processing to perform the processing in S114 again. To perform transmission in units of blocks through the loop processing again (S114), the control unit 20 transmits the block ID that is subsequent to the block ID of the block previously transmitted. By performing loop processing in this way, the control unit 20 sequentially transmits blocks divided from the update program, each having a predetermined data size, to the on-board ECU 3 to be updated.

Upon receiving the blocks transmitted from the on-board update device 2, the on-board ECU 3 to be updated stores the blocks in the storage areas that is the non-operating region (the first storage area 311 or the second storage area 312), and stores the block ID of the received block and information regarding the progress of reception (reception status) of the update program, which includes the reception time, in the storage unit 31.

While the loop processing is performed, i.e. while the transmission in units of blocks (S114) is sequentially performed in loop processing (S115), if the vehicle C is powered off (the IG switch is turned off), for example, the transmission in units of blocks is interrupted. The update program and information regarding the block ID of the block transmitted last time are left in the storage unit 21 of the on-board update device 2. The storage unit 21 of the on-board update device 2 stores information indicating that the on-board ECU 3 is being updated (the reprogramming status indicates "updating"). Thus, the pieces of information stored in the storage unit 21 indicates that the transmission of the update program to the on-board ECU 3 to be updated is in progress (the program for the on-board ECU 3 is being updated, and the reprogramming status indicates "updating").

If the block transmitted this time is the last block (S115: YES), the control unit 20 of the on-board update device 2 stores information indicating the completion of the update, in the storage unit 21 (S116). The control unit 20 of the on-board update device 2 transmits the last block to terminate the transmission of the update program for the on-board ECU 3, and stores information indicating that the update of the on-board ECU 3 has been completed, in the storage unit 21, in association with the identification information of the on-board ECU 3.

After receiving the last block transmitted from the on-board update device 2, the on-board ECU 3 stores information indicating that the update of the on-board ECU 3 has been completed, in the storage unit 31. After receiving the last block and switching to the update program that has been completely received, i.e. after switching the operating region to the storage area in which the update program is stored, the on-board ECU 3 may transmit information (a notification) indicating that switching to the update program has been completed, to the on-board update device 2. After receiving the notification indicating the completion of switching to the update program from the on-board ECU 3 to be updated, the control unit 20 of the on-board update device 2 may store information indicating that the on-board ECU 3 has been completely updated, including information indicating that the operating region has been switched, in the storage unit 21, in association with the identification information of the on-board ECU 3. After storing the information indicating the update of the on-board ECU 3 has been completed, in the storage unit 21, the control unit 20 of the on-board update device 2 may delete the update program.

Upon determining that the pieces of identification information are not different (S13: NO), i.e. upon determining that the pieces of identification information are the same, the control unit 20 of the on-board update device 2 acquires information regarding the reception status of the update program from the on-board ECU 3 to be updated (S131). The control unit 20 references the information regarding the progress of reception of the previous update program stored in the storage unit 21, and specifies the on-board ECU 3 that is being updated, from the identification information of the on-board ECU 3. The control unit 20 requests that the on-board ECU 3 that is being updated transmit information regarding the reception status of the update program received by the on-board ECU 3. The storage unit 21 of the on-board ECU 3 that is being updated stores the received block ID and information regarding the progress of reception of the update program at the time of reception or the like (reception status), and the control unit 30 of the on-board ECU 3 transmits the reception status of the update program to the on-board update device 2 via the vehicle interior communication unit 32. The control unit 20 of the on-board update device 2 acquires the reception status of the update program from the on-board ECU 3. Alternatively, if the reception of the previously transmitted update program has not been completed, the control unit 30 of the on-board ECU 3 may spontaneously transmit the reception status of the update program to the on-board update device 2.

The control unit 20 of the on-board update device 2 determines whether or not the information regarding the transmission status and the information regarding the reception status are consistent with each other (S132). For example, the control unit 20 compares the block ID of the block transmitted at the last time, which is stored in the storage unit 21, and the block ID of the block received by the on-board ECU 3 at the last time, which has been acquired from the on-board ECU 3, with each other. The control unit 20 determines whether or not these block IDs are the same to determine whether or not the information regarding the progress of transmission (transmission status) and the information regarding the progress of reception (reception status) are consistent with each other.

For example, if the block IDs of the transmitted block and the received block are the same, the control unit 20 determines that the information regarding the transmission status and the information regarding the reception status are consistent with each other. For example, if the block IDs of the transmitted block and the received block are not the same, or the on-board ECU 3 to be updated does not respond to the transmission request and the control unit 20 cannot acquire information regarding the reception status of the update program, the control unit 20 determines that the information regarding the transmission status and the information regarding the reception status are not consistent with each other. Alternatively, the on-board update device 2 and the on-board ECU 3 store check points that are determined based on the block IDs of the transmitted block and the received block. The control unit 20 of the on-board update device 2 may compare the check point stored in the control unit 20 and the check point stored in the on-board ECU 3 to determine whether or not the information regarding the transmission status and the information regarding the reception status are consistent with each other. It is possible to specify the interruption point at which the transmission and reception of the previous update program were interrupted, by using the block IDs of the blocks thus transmitted and received.

If the pieces of information are consistent with each other (S132: YES), the control unit 20 of the on-board update device 2 resumes the transmission of the update program from the interruption point (S133). The control unit 20 transmits the block having the block ID that is subsequent to the block ID of the block transmitted at the last time in the previous transmission of the update program, to resume the transmission of the update program. To resume the transmission of the update program, the control unit 20 may re-establish the programming session with the on-board ECU, and thereafter transmit the subsequent block. The programming session may be based on UDS (Unified Diagnostic Services) conforming to ISO 14229-1, for example. As a result of resuming the transmission of the update program from the interruption point, it is unnecessary to perform processing to transmit the blocks that have already been transmitted in the previous transmission of the update program, and it is possible to reduce the time required from the resumption to the completion of the transmission of the update program, and suppress an increase in traffic in the vehicle interior LAN 4.

The control unit 20 of the on-board update device 2 performs the processing in S134, S135, and S136 as with the processing in S114, S115, and S116.

If the pieces of information are not consistent with each other (S132: NO), the control unit 20 of the on-board update device 2 transmits the update program from the beginning (S1321). If this is the case, the on-board ECU 3 to be updated is the same before and after the interruption of the transmission and reception of the update program, and the on-board ECU 3 has not been replaced during the interruption of the transmission. However, for example, due to a communication error or the like caused by the interruption of the transmission and reception of the update program, the block ID of the block transmitted by the on-board update device 2 at the last time and the block ID of the block received by the on-board ECU 3 at the last time may be different. Even in such a case, the on-board ECU 3 to be updated is the same before and after the interruption of the transmission and reception of the update program. Therefore, the control unit 20 of the on-board update device 2 resumes the transmission of the update program from the beginning, i.e. from the first block. When transmitting the update program from the beginning, the control unit 20 establishes a programming session between the on-board update device 2 and the on-board ECU 3, and thereafter resumes the transmission of the update program (data transfer) from the beginning. When transmitting the update program in units of blocks, the control unit 20 starts transmitting the block that has the first block ID. The programming session may be based on UDS (Unified Diagnostic Services) conforming to ISO 14229-1, for example. Alternatively, after establishing the programming session, the control unit 20 of the on-board update device 2 may transmit an instruction (notification) to the on-board ECU 3 to delete the update program (the received blocks) received in the previously interrupted transmission, and thereafter resume the transmission of the update program from the beginning. Therefore, even if the block IDs of the transmitted block and the received block are different, and the interruption points for the on-board update device 2 and the on-board ECU 3 are different, it is possible to reliably transmit the update program to the on-board ECU 3 by resuming the transmission of the update program from the beginning.

The control unit 20 of the on-board update device 2 performs the processing in S1322, S1323, and S1324 as with the processing in S114, S115, and S116.

Although the transmission of the update program is cancelled when the ECU part numbers are different in the present embodiment, the present disclosure is not limited in this way. When determining that the pieces of identification information are different, the control unit 20 of the on-board update device 2 may determine that the on-board ECU 3 to be updated has been replaced during the interruption of the transmission, and cancel the transmission of the update program without resuming the transmission of the update program to the on-board ECU to be updated. That is to say, the control unit 20 may determine whether or not the pieces of identification information are the same based on the result of comparison between the serial numbers or the MAC addresses included in the pieces of identification information without considering whether or not the ECU part numbers are the same, and if they are different, the control unit 20 may determine that the on-board ECU 3 has been replaced during the interruption of the transmission, and cancel the transmission the update program.

If the on-board ECU 3 to be updated is replaced or removed during the interruption of the transmission of the update program, the transmission of the update program is cancelled, and the transmission is cancelled. Such replacement or removal may have been carried out illegitimately. However, the transmission of the update program to the on-board ECU 3 that has been replaced illegitimately is not resumed. Therefore, it is possible to prevent the update program from being received by an on-board ECU 3 that has been replaced illegitimately. Also, information indicating that the on-board ECU 3 to be updated has been replaced or removed is transmitted to the operator or the like of the vehicle C. Therefore, the operator can take an appropriate countermeasure.

Replacement or the like of the on-board ECU 3 to be updated has been performed during the interruption of the transmission of the update program, and the control unit 20 stores information regarding the transmission time point in the transmission of the update program in units of blocks by including it in information regarding the transmission status. Therefore, the control unit 20 can derive the period of time during in which the transmission of the update program has been interrupted, based on information regarding the transmission time point and the point at which the transmission of the update program is to be resumed, and specify that the on-board ECU 3 has been has been replaced, for example, during the derived period of time. The control unit 20 may output (transmit) a notification regarding the derived period of time by including it in the result of the determination. The operator or the like of the vehicle C can acquire more detailed information regarding replacement or removal of the on-board ECU 3.

Second Embodiment

Figure 7:
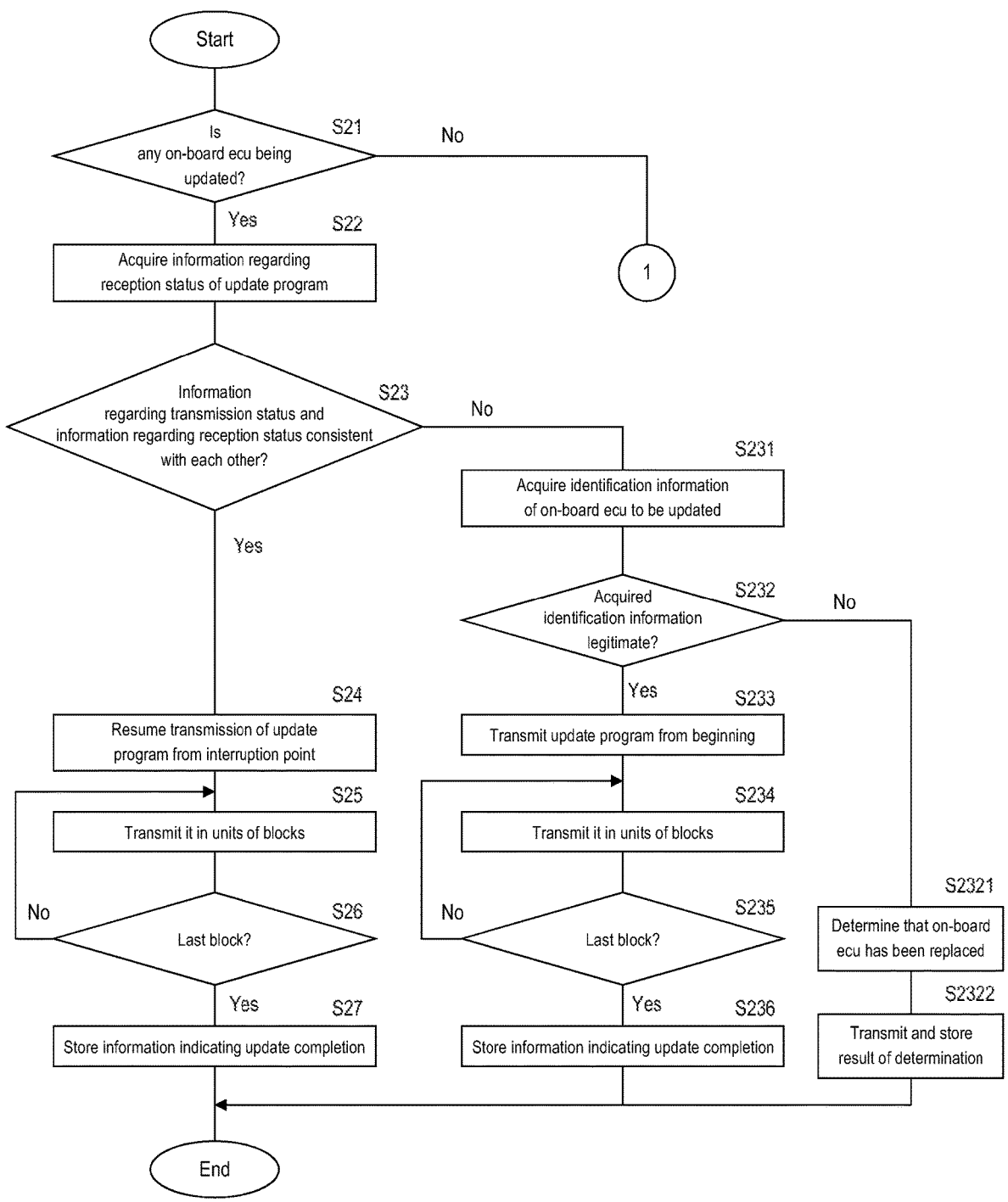
FIG. 7 is a flowchart illustrating processing that is performed by a control unit of an on-board update device according to a second embodiment.
Figure 8:
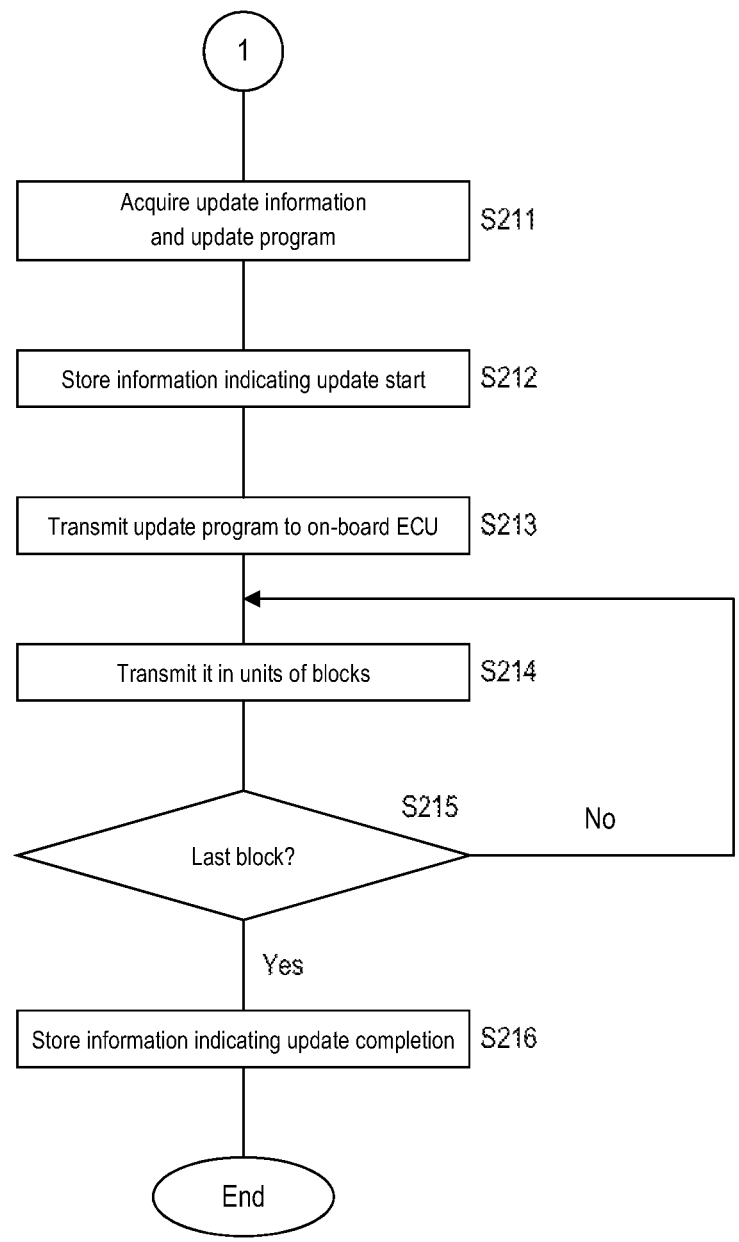
FIG. 8 is a flowchart illustrating processing that is performed by the control unit of the on-board update device according to the second embodiment.

FIG. 7 is a flowchart showing processing that is performed by the control unit 20 of the on-board update device 2. FIG. 8 is a flowchart showing processing that is performed by the control unit 20 of the on-board update device 2. In a state where the vehicle C has been started up (the IG switch is ON), the control unit 20 of the on-board update device 2 regularly communicates with the program providing device S1 via the vehicle exterior communication device 1 to perform the following processing.

The control unit 20 of the on-board update device 2 determines whether or not there is an on-board ECU 3 that is being updated (S21). The control unit 20 references information regarding the progress of transmission of the previous update program stored in the storage unit 21, and determines whether or not there is an on-board ECU 3 that is being updated. Although details will be described later, information regarding the progress of transmission of the update program includes identification information specifying the on-board ECU 3 to be updated (e.g. the serial number or the MAC address) and the block ID of the transmitted update program. The information regarding the progress of transmission of the update program includes also includes information regarding whether or not the transmission of the update program to the on-board ECU 3 is complete. For example, if the block ID of the update program previously transmitted is not the block ID of the last block of the update program to be transmitted, or if there is an on-board ECU 3 to which the transmission of the update program has not been completed, the control unit 20 determines that there is an on-board ECU 3 that is being updated. For example, if the block ID of the update program previously transmitted is the block ID of the last block of the update program to be transmitted, or if there is no on-board ECU 3 to which the transmission of the update program has not been completed, the control unit 20 determines that there is no on-board ECU 3 that is being updated.

When there is no on-board ECU 3 that is being updated (S21: NO), the control unit 20 of the on-board update device 2 acquires update information and the update program (S211). The control unit 20 of the on-board update device 2 communicates with the program providing device S1 via the vehicle exterior communication device 1 to check whether or not there is update information, and if there is update information, the control unit 20 acquires the update program corresponding thereto. The control unit 20 specifies the on-board ECU 3 to be updated, based on the acquired update information.

The control unit 20 of the on-board update device 2 stores information indicating the start of the update (S212). The control unit 20 stores information indicating that the update of the on-board ECU 3 has been started (the on-board ECU 3 is being updated) in the storage unit 21 in association with the identification information of the on-board ECU 3 to be updated.

The control unit 20 of the on-board update device 2 transmits the update program to the on-board ECU 3 (S213). The control unit 20 starts transmitting the update program. When starting the transmission of the update program, the control unit 20 may establish a session with the on-board ECU 3 that is the destination of the transmission. In S21, although the control unit 20 specifies the on-board ECU 3 to be updated, based on the acquired update information, the present disclosure is not limited in this way. For example, the control unit 20 transmits a predetermined packet or message generated based on the update information to all the on-board ECUs 3 provided in the vehicle C through multicasting. Thereafter, the control unit 20 may specify the on-board ECU 3 that has responded to the multicasting with the configuration information thereof as the on-board ECU 3 to be updated, and store information indicating that the update of the on-board ECU 3 has been started (the on-board ECU 3 is being updated) in the storage unit 21.

The control unit 20 of the on-board update device 2 transmits the update program to the on-board ECU 3 in units of blocks (S214). The control unit 20 transmits the update program in units of blocks divided from the update program, each having a predetermined data size. Alternatively, the control unit 20 may extract separators included in the update program, and divides the update program into blocks based on the separators. Each block is provided with a block ID that is used to identify the block. The control unit 20 stores the block ID of the transmitted block, and information regarding the progress of transmission (transmission status) of the update program, which includes the transmission time point, in the storage unit 21.

The control unit 20 of the on-board update device 2 determines whether or not the block transmitted this time is the last block (S215). For example, when dividing the update program into blocks each having a predetermined size, the control unit 20 confirms the number of blocks to be generated. The confirmed number of blocks is the last number of the block ID, and the control unit 20 determines whether or not the block ID of the block to be transmitted this time is the last number, thereby determining whether or not the block is the last block to complete the transmission of the update program.

If the block transmitted this time is not the last block (S215: NO), the control unit 20 of the on-board update device 2 performs loop processing to perform the processing in S214 again. To perform transmission in units of blocks through the loop processing again (S214), the control unit 20 transmits the block ID that is subsequent to the block ID of the block previously transmitted. By performing loop processing in this way, the control unit 20 sequentially transmits blocks divided from the update program, each having a predetermined data size, to the on-board ECU 3 to be updated.

Upon receiving the blocks transmitted from the on-board update device 2, the on-board ECU 3 to be updated stores the blocks in the storage areas that is the non-operating region (the first storage area 311 or the second storage area 312), and stores the block ID of the received block and information regarding the progress of reception (reception status) of the update program, which includes the reception time, in the storage unit 31.

While the loop processing is performed, i.e. while the transmission in units of blocks (S214) is sequentially performed in loop processing (S215), if the vehicle C is powered off (the IG switch is turned off), for example, the transmission in units of blocks is interrupted. The update program and information regarding the block ID of the block transmitted last time are left in the storage unit 21 of the on-board update device 2. The storage unit 21 of the on-board update device 2 stores information indicating that the on-board ECU 3 is being updated (the reprogramming status indicates "updating"). Thus, the pieces of information stored in the storage unit 21 indicates that the transmission of the update program to the on-board ECU 3 to be updated is in progress (the program for the on-board ECU 3 is being updated, and the reprogramming status indicates "updating").

If the block transmitted this time is the last block (S215: YES), the control unit 20 of the on-board update device 2 stores information indicating the completion of the update, in the storage unit 21 (S216). The control unit 20 of the on-board update device 2 transmits the last block to terminate the transmission of the update program for the on-board ECU 3, and stores information indicating that the update of the on-board ECU 3 has been completed, in the storage unit 21, in association with the identification information of the on-board ECU 3.

After receiving the last block transmitted from the on-board update device 2, the on-board ECU 3 stores information indicating that the update of the on-board ECU 3 has been completed, in the storage unit 31. After receiving the last block and switching to the update program that has been completely received, i.e. after switching the operating region to the storage area in which the update program is stored, the on-board ECU 3 may transmit information (a notification) indicating that switching to the update program has been completed, to the on-board update device 2. After receiving the notification indicating the completion of switching to the update program from the on-board ECU 3 to be updated, the control unit 20 of the on-board update device 2 may store information indicating that the on-board ECU 3 has been completely updated, including information indicating that the operating region has been switched, in the storage unit 21, in association with the identification information of the on-board ECU 3. After storing the information indicating the update of the on-board ECU 3 has been completed, in the storage unit 21, the control unit 20 of the on-board update device 2 may delete the update program.

If there is an on-board ECU 3 that is being updated (S21: YES), the control unit 20 of the on-board update device 2 acquires information regarding the reception status of the update program from the on-board ECU 3 to be updated (S22). The control unit 20 references the information regarding the progress of reception of the previous update program stored in the storage unit 21, and specifies the on-board ECU 3 that is being updated, from the identification information of the on-board ECU 3. The control unit 20 requests that the on-board ECU 3 that is being updated transmit information regarding the reception status of the update program received by the on-board ECU 3. The storage unit 21 of the on-board ECU 3 that is being updated stores the received block ID and information regarding the progress of reception of the update program at the time of reception or the like (reception status), and the control unit 30 of the on-board ECU 3 transmits the reception status of the update program to the on-board update device 2 via the vehicle interior communication unit 32. The control unit 20 of the on-board update device 2 acquires the reception status of the update program from the on-board ECU 3. Alternatively, if the reception of the previously transmitted update program has not been completed, the control unit 30 of the on-board ECU 3 may spontaneously transmit the reception status of the update program to the on-board update device 2.

The control unit 20 of the on-board update device 2 determines whether or not the information regarding the transmission status and the information regarding the reception status are consistent with each other (S23). For example, the control unit 20 compares the block ID of the block transmitted at the last time, which is stored in the storage unit 21, and the block ID of the block received by the on-board ECU 3 at the last time, which has been acquired from the on-board ECU 3, with each other. The control unit 20 determines whether or not these block IDs are the same to determine whether or not the information regarding the progress of transmission (transmission status) and the information regarding the progress of reception (reception status) are consistent with each other.

For example, if the block IDs of the transmitted block and the received block are the same, the control unit 20 determines that the information regarding the transmission status and the information regarding the reception status are consistent with each other. For example, if the block IDs of the transmitted block and the received block are not the same, or the on-board ECU 3 to be updated does not respond to the transmission request and the control unit 20 cannot acquire information regarding the reception status of the update program, the control unit 20 determines that the information regarding the transmission status and the information regarding the reception status are not consistent with each other. Alternatively, the on-board update device 2 and the on-board ECU 3 store check points that are determined based on the block IDs of the transmitted block and the received block. The control unit 20 of the on-board update device 2 may compare the check point stored in the control unit 20 and the check point stored in the on-board ECU 3 to determine whether or not the information regarding the transmission status and the information regarding the reception status are consistent with each other. It is possible to specify the interruption point at which the transmission and reception of the previous update program were interrupted, by using the block IDs of the blocks thus transmitted and received.

If the pieces of information are consistent with each other (S23: YES), the control unit 20 of the on-board update device 2 resumes the transmission of the update program from the interruption point (S24). The control unit 20 transmits the block having the block ID that is subsequent to the block ID of the block transmitted at the last time in the previous transmission of the update program, to resume the transmission of the update program. To resume the transmission of the update program, the control unit 20 may re-establish the programming session with the on-board ECU, and thereafter transmit the subsequent block. The programming session may be based on UDS (Unified Diagnostic Services) conforming to ISO 14229-1, for example. As a result of resuming the transmission of the update program from the interruption point, it is unnecessary to perform processing to transmit the blocks that have already been transmitted in the previous transmission of the update program, and it is possible to reduce the time required from the resumption to the completion of the transmission of the update program, and suppress an increase in traffic in the vehicle interior LAN 4.

The control unit 20 of the on-board update device 2 performs the processing in S25, S26, and S27 as with the processing in S214, S215, and S216.

If the pieces of information are not consistent with each other (S23: NO), the control unit 20 of the on-board update device 2 acquires the identification information of the on-board ECU 3 to be updated (S231). The control unit 20 of the on-board update device 2 requests that the on-board ECU 3 to be updated transmit the ECU's own identification information thereto. The control unit 20 receives and acquires the identification information transmitted from the on-board ECU 3. The identification information transmitted from the on-board ECU 3 includes, for example, the serial number or the MAC address of the on-board ECU 3. The identification information transmitted from the on-board ECU 3 may also include information regarding the version of the program for the on-board ECU 3. Alternatively, the on-board ECU 3 may transmit all the pieces of configuration information regarding the ECU, stored in the storage unit 31, to the on-board update device 2.

The control unit 20 of the on-board update device 2 determines whether or not the identification information acquired from the on-board ECU 3 to be updated is legitimate (S232). The control unit 20 compares the identification information acquired from the on-board ECU 3 with the identification information of the on-board ECU 3 stored in the storage unit 21, indicating that the update program is being transmitted thereto, and if these pieces of information are the same, the control unit 20 determines that the acquired piece of identification information is legitimate. If these pieces of information are not the same, the control unit 20 determines that the acquired identification information is not legitimate, i.e. illegitimate. Note that, if the on-board ECU 3 to be updated does not respond to the transmission request and the identification information cannot be acquired, such a case is regarded the same as the case in which the pieces of identification information are not the same, and the control unit 20 determines that the acquired pieces of identification information is not legitimate, i.e. illegitimate.

Although the above control unit 20 makes a comparison with the identification information of the on-board ECU 3 stored in the storage unit 21, the present disclosure is not limited in this way. The configuration information regarding the on-board ECU 3 provided in the vehicle C may be stored in the program providing device S1, and the control unit 20 may derive the identification information of the on-board ECU 3 that is in the middle of transmission of the update program, based on the configuration information regarding the on-board ECU 3 transmitted from the program providing device S1. By storing the configuration information regarding the on-board ECU 3 in the program providing device S1, it is possible to leave a sufficient free space in the storage unit 21 of the on-board update device 2. Also, even if the on-board update device 2 is replaced, it is possible to reduce the influence of the replacement.

If it is determined that the identification information is legitimate (S232: YES), the control unit 20 of the on-board update device 2 transmits the update program from the beginning (S233). If it is determined that the identification information is legitimate, the on-board ECU 3 to be updated is the same before and after the interruption of the transmission and reception of the update program. However, for example, due to a communication error or the like caused by the interruption of the transmission and reception of the update program, the block ID of the block transmitted by the on-board update device 2 at the last time and the block ID of the block received by the on-board ECU 3 at the last time may be different. Even in such a case, the on-board ECU 3 to be updated is the same before and after the interruption of the transmission and reception of the update program. Therefore, the control unit 20 of the on-board update device 2 resumes the transmission of the update program from the beginning, i.e. from the first block. When transmitting the update program from the beginning, the control unit 20 establishes a programming session between the on-board update device 2 and the on-board ECU 3, and thereafter resumes the transmission of the update program (data transfer) from the beginning. When transmitting the update program in units of blocks, the control unit 20 starts transmitting the block that has the first block ID. The programming session may be based on UDS (Unified Diagnostic Services) conforming to ISO 14229-1, for example. Alternatively, after establishing the programming session, the control unit 20 of the on-board update device 2 may transmit an instruction (notification) to the on-board ECU 3 to delete the update program (the received blocks) received in the previously interrupted transmission, and thereafter resume the transmission of the update program from the beginning. Therefore, even if the block IDs of the transmitted block and the received block are different, and the interruption points for the on-board update device 2 and the on-board ECU 3 are different, it is possible to reliably transmit the update program to the on-board ECU 3 by resuming the transmission of the update program from the be ginning.

The control unit 20 of the on-board update device 2 performs the processing in S234, S235, and S236 as with the processing in S214, S215, and S216.

If it is determined that the identification information is not legitimate (illegitimate) (S232: NO), the control unit 20 of the on-board update device 2 determines that the on-board ECU 3 has been replaced (S2321). If the identification information acquired from the on-board ECU 3 to be updated and the stored identification information of the on-board ECU 3, indicating that the update program is being transmitted thereto, are not the same, or the on-board ECU 3 to be updated does not respond to the transmission request and the identification information cannot be acquired, the control unit 20 determines that the on-board ECU 3 has been replaced during the interruption of the transmission of the update program. In the case in which the on-board ECU 3 to be updated does not respond to the transmission request and the identification information cannot be acquired, the control unit 20 of the on-board update device 2 may determine that the on-board ECU 3 to be updated has been replaced during the interruption of the transmission of the update program. The control unit 20 determines that the on-board ECU 3 has been replaced or removed, and cancels the transmission of the update program without resuming the transmission.

The transmission of the update program is interrupted when, for example, the vehicle C is powered off (the IG switch is turned off). Therefore, even if the on-board ECU 3 to be updated is replaced or removed during the interruption of the transmission of the update program caused due to the vehicle C being powered off in the middle of the transmission of the update program, it is possible to reliably detect the replacement or the removal.

The control unit 20 of the on-board update device 2 stores the result of the determination (S2322). The control unit 20 outputs (transmits) the result of the determination indicating that the on-board ECU 3 to be updated is replaced or removed during the interruption of the transmission of the update program, to the program providing device S1 outside the vehicle, the display device 5 provided in the vehicle C, or both the program providing device S1 and the display device 5 provided in the vehicle C, to notify them of the replacement or removal. The control unit 20 may include the identification information of the on-board ECU 3 stored in the storage unit 21, indicating that the update program is being transmitted thereto, in the result of the determination, and output (transmit) it to make a notification. Alternatively, the control unit 20 may also output (transmit) the identification information of the on-board ECU 3 that has been determined having been replaced during the interruption of the transmission of the update program (the identification information received from the on-board ECU 3 after the replacement) to make a notification. Alternatively, the control unit 20 of the on-board update device 2 may transmit a mobile terminal such as a smartphone belonging to the operator of the vehicle C via the vehicle exterior communication device 1, to notify the operator of the fact that the on-board ECU 3 to be updated has been replaced or removed. The control unit 20 stores, in the storage unit 21, information indicating that the on-board ECU 3 to be updated has been replaced or removed, as well as the received identification information or information indicating that identification information has not be received, in association with the configuration information regarding the on-board ECU 3, indicating that the update program is being transmitted.

Although the on-board update device 2 in the present embodiment is a gateway (a relay device) that generally controls the segments of a plurality of systems of the on-board ECUs 3, the present disclosure is not limited in this way. The on-board update device 2 may be connected to a specific segment, and may be a dedicated device that is separate from a gateway.

In the present embodiment, the control unit 20 of the on-board update device 2 collects configuration information regarding the on-board ECU, determines consistency of information regarding transmission and reception statuses, and determines legitimacy of the identification information of the on-board ECU 3 to be updated. However, the present disclosure is not limited in this way. Functional units that collect configuration information regarding the on-board ECU, determine consistency of information regarding transmission and reception statuses, and determine legitimacy of the identification information of the on-board ECU 3 to be updated may be dispersed in a plurality of on-board devices such as a gateway and a body ECU, and may function by communicating and being linked with each other, or cooperating with each other.

Third Embodiment

Figure 9:
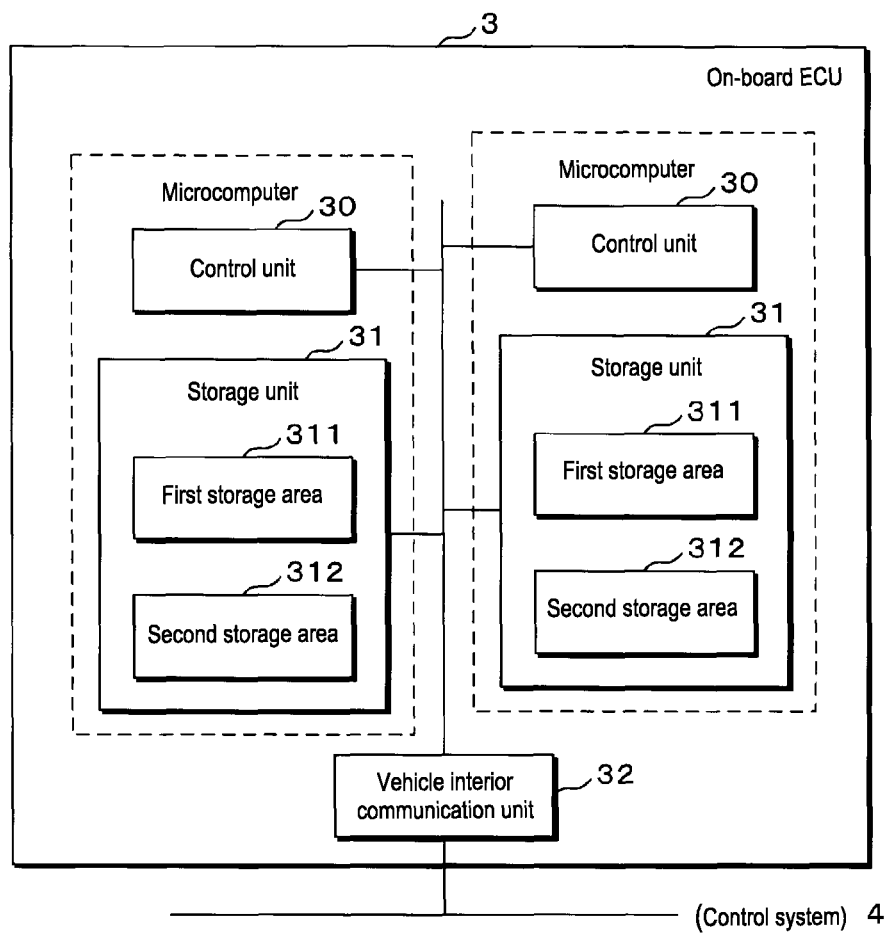
FIG. 9 is a block diagram illustrating a configuration of an on-board ECU 3 according to a third embodiment.

FIG. 9 is a block diagram illustrating a configuration of an on-board ECU 3 according to a third embodiment. The on-board ECU 3 according to the third embodiment includes plurality of microcomputers each including the control unit 30 and the storage unit 31. The control unit 20 of the on-board update device 2 acquires configuration information (vehicle configuration information) and the update history of the configuration information (vehicle configuration information update history) corresponding to the on-board ECU 3 that includes such a plurality of microcomputers, from the on-board ECU 3, and stores them in the storage unit 21.

Each ECU 3 includes, as in the first embodiment, the control unit 30, the storage unit 31, and the vehicle interior communication unit 32. The configurations of the control unit 30, the storage unit 31, and the vehicle interior communication unit 32 are the same as those in the first embodiment.

The on-board ECU 3 includes a plurality of (two in the drawing) microcomputers or substrate circuits each including the control unit 30 and the storage unit 31, and the storage unit 31 of each microcomputer or the like stores a different program. Each control unit 30 of the on-board ECU 3 is configured to execute the program stored in the storage unit 21 disposed in the same microcomputer or the like in which the control unit 30 is disposed, so that different kinds of processing can be performed in parallel according to different programs. Vehicle configuration information regarding the on-board ECU 3 that includes a plurality of microcomputers as described above includes a plurality (corresponding to the number of microcomputers) of software part numbers, current versions of the program, and old versions of the program for the same manufacturing number (serial number) and ECU part number (the part number, the model number).

FIG. 10 is an illustration diagram illustrating an aspect of configuration information regarding each on-board ECU 3. As in the first embodiment, the storage unit 21 of the on-board update device 2 stores configuration information regarding all the on-board ECUs 3 provided in the vehicle C. Configuration information regarding the on-board ECUs 3 (a vehicle configuration information master table) in the present embodiment include the same management items (fields) as in the first embodiment. Upon receiving pieces of vehicle configuration information from an on-board ECU 3 that includes a plurality of microcomputers, the control unit 20 of the on-board update device 2 may, for example, add branch numbers (001-1, 001-2, 001-n) corresponding to the number of microcomputers included in the on-board ECU 3 to the ECU-ID, and store and manage the programs stored in the storage units 21 of the individual microcomputers included in the single on-board ECU 3 as separate records. As shown in FIG. 10, in the present embodiment, each ECU-ID with a branch number is formed such that the main number (001) of the ECU-ID and the branch number (1, 2, n) are connected by "-". As described above, vehicle configuration information regarding the on-board ECU 3 that includes a plurality of microcomputers as described above includes a plurality (corresponding to the number of microcomputers) of software part numbers and so on for the same manufacturing number (serial number) and ECU part number (the part number, the model number). The control unit 20 of the on-board update device 2 may issue ECU-IDs with the respective branch numbers by adding branch numbers to the same ECU-ID corresponding to the same manufacturing number (serial number) and ECU part number (the part number, the model number), and register the software part number of each program executed by the corresponding microcomputer, the current version and the old version of the program, the number of operating regions, and the operating region in the vehicle configuration information master table, using the ECU-IDs with the respective branch numbers as unique numbers. In this case, the manufacturing number (the serial number) and the ECU part number (the part number, the model number) registered in association with the ECU-IDs with the respective branch numbers, in which the main numbers are the same, are the same.

As in the first embodiment, when performing the processing to determine whether or not the identification information acquired from the on-board ECU 3 to be updated is different (S13) or when performing the processing to determine whether or not the ECU part number included in the identification information is different (S15), the control unit 20 of the on-board update device 2 performs such determination processing based on the ECU-IDs with the respective branch numbers, the number of such ECU-IDs corresponding to the number of the microcomputers included in the on-board ECU 3.

As described above, by using ECU-IDs with the respective branch numbers, the number of such ECU-IDs corresponding to the number of the microcomputers included in the on-board ECU 3, it is possible to address the case of on-board ECUs 3 that have the same manufacturing number (serial number) and ECU part number (part number and model number), but have pieces of vehicle configuration information, each including a software part number, the current version of the program, and so on, corresponding to a plurality of programs (an on-board ECU 3 including a plurality of microcomputers). That is to say, even if only one microcomputer included in an on-board ECU 3 that includes a plurality of microcomputers has been replaced or removed during an interruption of transmission of an update program, it is possible to detect the replacement or the like and appropriately address such a case as in the first embodiment.

In the present embodiment, an ECU-ID with a branch number is stored in an ECU-ID field. However, the present disclosure is not limited in this way. For example, in the vehicle configuration information master table, a field for the main number of an ECU-ID and a field for the branch number of the same may be set as separate fields, and the main number (001) of the ECU-ID may be stored in the field for the main number and the branch number (1, 2, n) may be stored in the field for the branch number.

In the present embodiment, vehicle configuration information regarding an on-board ECU 3 that includes a plurality of microcomputers is stored and managed by using ECU-IDs with the respective branch numbers. However, such an aspect is an example, and the present disclosure is not limited to such an example. Upon receiving vehicle from an on-board ECU 3 that includes a plurality of microcomputers, the control unit 20 of the on-board update device 2 may store the programs respectively executed by the microcomputers in the fields of the same record, using a single ECU-ID as a unique key, in the same manner as in the first embodiment. That is to say, the control unit 20 of the on-board update device 2 may concatenate the character strings such as the software part number and so on of each program included in the vehicle configuration information from the on-board ECU 3 including the plurality of microcomputers, and store the value formed from the concatenated character strings in the field for the software part number in the record of the ECU-ID. As descried above, by managing the software part number and so on by concatenating the character strings thereof, even if a microcomputer of the plurality of microcomputers included in an on-board ECU 3 is illegitimately replaced, it is possible to detect the replacement or the like, and appropriately address such a case as in the first embodiment.

The present embodiments in the present disclosure are examples in all aspects, and should be construed as non-limiting. The scope of the present disclosure is not limited to the above meanings, but is indicated by the claims, and is intended to include all modifications within the meaning and scope equivalent to the scope of the claims.

The invention claimed is:

1. An on-board update device that acquires an update program transmitted from an external server located outside a vehicle, and performs processing to update a program for an on-board ECU provided in the vehicle, the on-board update device comprising
a control unit that controls transmission of the update program to the on-board ECU,
wherein, when the transmission is to be resumed after an interruption of the transmission, if identification information of the on-board ECU is different from the identification information before the interruption of the transmission, the control unit determines that the on-board ECU has been replaced during the interruption of the transmission, and performs predetermined processing.

2. The on-board update device according to claim 1, wherein the predetermined processing to be performed by the control unit is processing performed to transmit information regarding the determination to the external server or a display device provided in the vehicle.

3. The on-board update device according to claim 1, wherein the predetermined processing to be performed by the control unit is processing performed to store information regarding the determination.

4. The on-board update device according to claim 1, wherein the predetermined processing to be performed by the control unit is processing performed to cancel the transmission of the update program.

5. The on-board update device according to claim 1, wherein, when the transmission is to be resumed after an interruption of the transmission,
if a predetermined item included in the identification information of the on-board ECU and a predetermined item included in the identification information before the interruption of the transmission are the same, the control unit resumes the transmission of the update program from the beginning, and
if a predetermined item included in the identification information of the on-board ECU and a predetermined item included in the identification information before the interruption of the transmission are not the same, the control unit cancels the transmission of the update program.

6. The on-board update device according to claim 5, wherein the predetermined item included in the identification information of the on-board ECU is information regarding an ECU part number of the on-board ECU.

7. The on-board update device according to claim 1, wherein, when the transmission is to be resumed after an interruption of the transmission, if the identification information of the on-board ECU is the same as the identification information before the interruption of the transmission, the control unit resumes the transmission of the update program.

8. The on-board update device according to claim 7, wherein the control unit
stores information regarding a transmission status of the update program transmitted to the on-board ECU, if the transmission is interrupted, acquires information regarding a reception status of the update program received from the on-board ECU, if the information regarding the transmission status and the acquired information regarding the reception status are consistent with each other, resumes the transmission of the update program to the on-board ECU from an interruption point that is determined based on the information regarding the transmission status or the information regarding the reception status, and if the information regarding the transmission status and the acquired information regarding the reception status are not consistent with each other, resumes the transmission of the update program to the on-board ECU from the beginning.

9. A method for updating a program, comprising:

acquiring an update program transmitted from an external server located outside a vehicle;

transmitting the update program to an on-board ECU; and when the transmission is to be resumed after an interruption of the transmission, if identification information of the on-board ECU is different from the identification information before the interruption of the transmission, determining that the on-board ECU has been replaced during the interruption of the transmission, and performing predetermined processing.

10. An on-board update system to be provided in a vehicle, comprising:

a vehicle exterior communication device that acquires an update program transmitted from an external server located outside a vehicle;

an on-board update device that acquires an update program transmitted from the external server via the vehicle exterior communication device; and an on-board ECU that updates a program, using the update program transmitted from the on-board update device, wherein the on-board update device includes a control unit that controls transmission of the update program to the on-board ECU, and when the transmission is to be resumed after an interruption of the transmission, if identification information of the on-board ECU is different from the identification information before the interruption of the transmission, the control unit determines that the on-board ECU has been replaced during the interruption of the transmission, and performs predetermined processing.

* * * * *